US010831581B2

(12) United States Patent
Yagi

(10) Patent No.: US 10,831,581 B2
(45) Date of Patent: Nov. 10, 2020

(54) FILE INFORMATION COLLECTION SYSTEM AND METHOD, AND STORAGE MEDIUM

(71) Applicant: NEC Corporation, Minato-ku, Tokyo (JP)

(72) Inventor: Shinjiro Yagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 211 days.

(21) Appl. No.: 15/779,156

(22) PCT Filed: Dec. 1, 2016

(86) PCT No.: PCT/JP2016/085754
§ 371 (c)(1),
(2) Date: May 25, 2018

(87) PCT Pub. No.: WO2017/094845
PCT Pub. Date: Jun. 8, 2017

(65) Prior Publication Data
US 2018/0357119 A1   Dec. 13, 2018

(30) Foreign Application Priority Data
Dec. 4, 2015 (JP) .................................. 2015-237675

(51) Int. Cl.
*G06F 11/00* (2006.01)
*G06F 11/07* (2006.01)
(Continued)

(52) U.S. Cl.
CPC .......... *G06F 11/0769* (2013.01); *G06F 11/07* (2013.01); *G06F 11/0775* (2013.01); *G06F 16/11* (2019.01); *G06F 16/1734* (2019.01)

(58) Field of Classification Search
CPC ............. G06F 11/0751; G06F 11/0766; G06F 11/0769; G06F 11/0775; G06F 11/0778;
(Continued)

(56) References Cited

U.S. PATENT DOCUMENTS 8,041,683 B1 * 10/2011 Korolev .............. H04L 67/1097
707/672
8,881,129 B1 * 11/2014 McKinnon .......... G06F 11/3688
717/168
(Continued)

FOREIGN PATENT DOCUMENTS

| JP | 2003-216457 A | 7/2003 |
|---|---|---|
| JP | 2010-244306 A | 10/2010 |
| JP | 2011-197785 A | 10/2011 |

OTHER PUBLICATIONS

International Search Report for PCT Application No. PCT/JP2016/085754, dated Jan. 24, 2017.
(Continued)

*Primary Examiner* — Sarai E Butler

(57) ABSTRACT

Provided is a file information collection system etc., to determine an appropriate log file for failure analysis in a case that an alert occurs in any server belonging to a system in operation and to generate a list of a file name of the file. In the system includes; information acquisition means that acquires a process ID of each process etc., used by the each process; list generation means that selects a file whose name meets a predetermined condition, generates a list of a record including identification information of a server, and, adds the list at a bottom of an already-generated list; and sequence control means that selects the record from a top of the list, acquires information about an update time of a file, and, changes a server attribute in the selected record and moves the record to a bottom of the list.

13 Claims, 26 Drawing Sheets

(51) Int. Cl.
*G06F 16/11* (2019.01)
*G06F 16/17* (2019.01)

(58) Field of Classification Search
CPC ............. G06F 11/0781; G06F 11/0784; G06F 11/0787; G06F 11/08; G06F 11/14; G06F 11/1479; G06F 11/16; G06F 11/22; G06F 11/0772
USPC .......................................................... 714/48
See application file for complete search history.

(56) References Cited

U.S. PATENT DOCUMENTS

| | | | | |
|---|---|---|---|---|
| 2005/0154821 A1* | 7/2005 | Furuhashi | ........... | G06F 11/1076 711/112 |
| 2006/0015826 A1* | 1/2006 | Shiozawa | ........... | G06F 3/04812 715/864 |
| 2006/0248165 A1* | 11/2006 | Sridhar | ............... | H04L 41/5006 709/218 |
| 2007/0088981 A1* | 4/2007 | Noble | ................ | H04B 17/0085 714/26 |
| 2008/0155337 A1* | 6/2008 | Usui | .................... | G06F 11/0748 714/37 |
| 2010/0083031 A1* | 4/2010 | Koike | ................. | G06F 11/1482 714/3 |
| 2010/0306595 A1* | 12/2010 | Murata | ............... | G06F 11/3688 714/39 |
| 2011/0029565 A1* | 2/2011 | Estevez | ................. | G06Q 30/02 707/783 |
| 2013/0031414 A1* | 1/2013 | Dhuse | ................. | G06F 11/0727 714/37 |
| 2013/0142320 A1* | 6/2013 | Williams | ............... | H04M 3/487 379/93.25 |
| 2014/0289303 A1* | 9/2014 | Tarricone | ................ | H04L 67/10 709/201 |
| 2014/0325277 A1* | 10/2014 | Sonoda | ................. | G06F 11/263 714/27 |

OTHER PUBLICATIONS

English translation of Written opinion for PCT Application No. PCT/JP2016/085754.

* cited by examiner

| CONDITION | NOTATION |
|---|---|
| include | .*/log[s]*/.* |
| include | .*.log[.+]* |
| exclude | /dev/.* |

Fig. 8

SERVER 1 (51)

| PID | PROCESS NAME | PARENT PID |
|---|---|---|
| 100 | httpd | 0 |
| 101 | httpd | 100 |
| 102 | httpd | 100 |

(54)

| PID | FILE NAME | FILE ATTRIBUTE |
|---|---|---|
| 100 | /var/log/access.log | W |
| 100 | /var/log/error.log | W |
| 100 | /dev/urandom | R |
| 101 | /var/log/access.log | W |
| 101 | /var/log/error.log | W |
| 101 | /dev/urandom | R |
| 102 | /var/log/access.log | W |
| 102 | /var/log/error.log | W |
| 102 | /dev/urandom | R |

SERVER 2 (52)

| PID | PROCESS NAME | PARENT PID |
|---|---|---|
| 200 | java | 0 |
| 201 | java | 200 |
| 202 | java | 200 |

(55)

| PID | FILE NAME | FILE ATTRIBUTE |
|---|---|---|
| 200 | /opt/tomcat/log/catalina.out | W |
| 200 | /opt/tomcat/log/catalina.log | W |
| 200 | /opt/tomcat/log/localhost.log | W |
| 200 | /opt/tomcat/log/host-manager.log | W |
| 200 | /usr/lib/rt.jar | R |

SERVER 3 (53)

| PID | PROCESS NAME | PARENT PID |
|---|---|---|
| 300 | mysqld-safe | 0 |
| 301 | mysqld | 300 |
| 302 | mysqld | 301 |
| 303 | mysqld | 301 |

(56)

| PID | FILE NAME | FILE ATTRIBUTE |
|---|---|---|
| 300 | /dev/null | W |
| 300 | /dev/null | R |
| 301 | /var/log/mysqld.log | W |
| 301 | /var/lib/mysql/ib_logfile | W |

Fig. 9

| SERVER NAME | FILE NAME | SERVER ATTRIBUTE | FILE TYPE |
|---|---|---|---|
| SERVER 2 | /opt/tomcat/log/catalina.out | ORIGIN | LOG FILE |
| SERVER 2 | /opt/tomcat/log/catalina.log | ORIGIN | LOG FILE |
| SERVER 2 | /opt/tomcat/log/localhost.log | ORIGIN | LOG FILE |
| SERVER 2 | /opt/tomcat/log/host-manager.log | ORIGIN | LOG FILE |

Fig. 10

| SERVER NAME | FILE NAME | SERVER ATTRIBUTE | FILE TYPE |
|---|---|---|---|
| SERVER 2 | /opt/tomcat/log/catalina.out | ORIGIN | LOG FILE |
| SERVER 2 | /opt/tomcat/log/catalina.log | ORIGIN | LOG FILE |
| SERVER 2 | /opt/tomcat/log/localhost.log | ORIGIN | LOG FILE |
| SERVER 2 | /opt/tomcat/log/host-manager.log | ORIGIN | LOG FILE |
| SERVER 3 | /var/log/mysqld.log | CALLEE | LOG FILE |
| SERVER 3 | /var/lib/mysql/ib_logfile | CALLEE | LOG FILE CANDIDATE |

Fig. 11

| SERVER NAME | FILE NAME | SERVER ATTRIBUTE | FILE TYPE |
|---|---|---|---|
| SERVER 2 | /opt/tomcat/log/catalina.out | ORIGIN | LOG FILE |
| SERVER 2 | /opt/tomcat/log/catalina.log | ORIGIN | LOG FILE |
| SERVER 2 | /opt/tomcat/log/localhost.log | ORIGIN | LOG FILE |
| SERVER 2 | /opt/tomcat/log/host-manager.log | ORIGIN | LOG FILE |
| SERVER 3 | /var/log/mysqld.log | CALLEE | LOG FILE |
| SERVER 1 | /var/log/access.log | CALLER | LOG FILE |
| SERVER 1 | /var/log/error.log | CALLER | LOG FILE |
| SERVER 3 | /var/lib/mysql/ib_logfile | CALLEE | LOG FILE CANDIDATE |

Fig. 13

| SEQUENCE NUMBER | SERVER NAME | FILE NAME | SERVER ATTRIBUTE | FILE TYPE | UPDATE DATE AND TIME |
|---|---|---|---|---|---|
| 1 | SERVER 2 | /opt/tomcat/log/catalina.out | ORIGIN | LOG FILE | 2015/08/24 14:00:00 |
| 2 | SERVER 2 | /opt/tomcat/log/catalina.log | ORIGIN | LOG FILE | 2015/08/24 14:00:00 |
| 3 | SERVER 3 | /var/log/mysqld.log | CALLEE | LOG FILE | |
| 4 | SERVER 1 | /var/log/access.log | CALLER | LOG FILE | |
| 5 | SERVER 1 | /var/log/error.log | CALLER | LOG FILE | |
| 6 | SERVER 3 | /var/lib/mysql/ib_logfile | CALLEE | LOG FILE CANDIDATE | |
| 7 | SERVER 2 | /opt/tomcat/log/localhost.log | REFERENCE | LOG FILE | 2015/08/24 00:00:00 |
| 8 | SERVER 2 | /opt/tomcat/log/host-manager.log | REFERENCE | LOG FILE | 2015/08/24 01:00:00 |

Fig. 14

| SEQUENCE NUMBER | SERVER NAME | FILE NAME | SERVER ATTRIBUTE | FILE TYPE | UPDATE DATE AND TIME |
|---|---|---|---|---|---|
| 1 | SERVER 2 | /opt/tomcat/log/catalina.out | ORIGIN | LOG FILE | 2015/08/24 14:00:00 |
| 2 | SERVER 2 | /opt/tomcat/log/catalina.log | ORIGIN | LOG FILE | 2015/08/24 14:00:00 |
| 3 | SERVER 3 | /var/log/mysqld.log | CALLEE | LOG FILE | 2015/08/24 14:00:00 |
| 4 | SERVER 1 | /var/log/access.log | CALLER | LOG FILE | 2015/08/24 14:00:00 |
| 5 | SERVER 1 | /var/log/error.log | CALLER | LOG FILE | 2015/08/24 14:00:00 |
| 6 | SERVER 3 | /var/lib/mysql/ib_logfile | CALLEE | LOG FILE CANDIDATE | 2015/08/24 14:00:00 |
| 7 | SERVER 2 | /opt/tomcat/log/localhost.log | REFERENCE | LOG FILE | 2015/08/24 00:00:00 |
| 8 | SERVER 2 | /opt/tomcat/log/host-manager.log | REFERENCE | LOG FILE | 2015/08/24 01:00:00 |

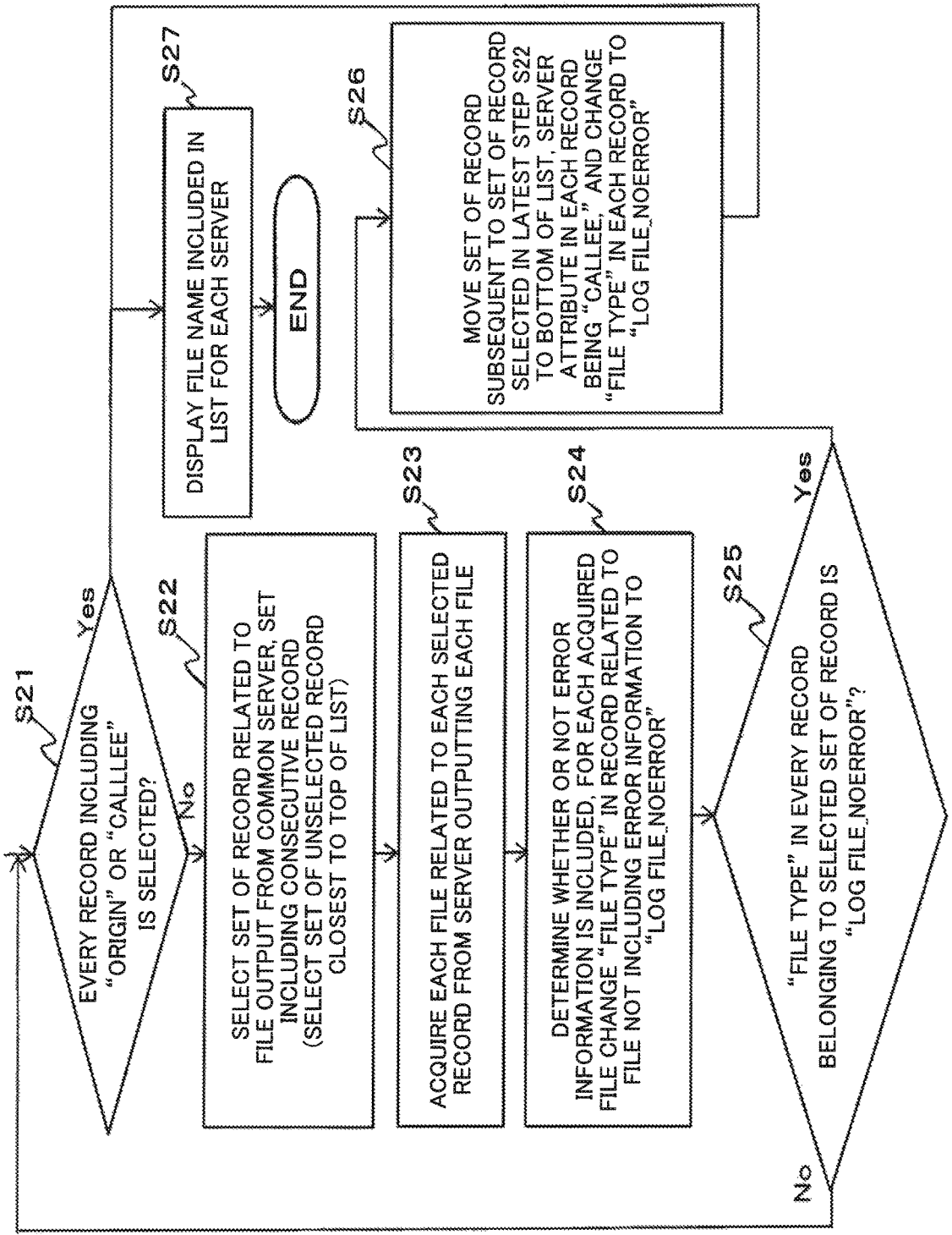

Fig. 18

| SEQUENCE NUMBER | SERVER NAME | FILE NAME | SERVER ATTRIBUTE | FILE TYPE | UPDATE DATE AND TIME |
|---|---|---|---|---|---|
| 1 | SERVER 2 | /var/log/sample.log | ORIGIN | LOG FILE | 2015/08/24 14:00:00 |
| 2 | SERVER 2 | /var/log/error.log | ORIGIN | LOG FILE | 2015/08/24 14:00:00 |
| 3 | SERVER 3 | /opt/tomcat/log/catalina.out | CALLEE | LOG FILE | 2015/08/24 14:00:00 |
| 4 | SERVER 3 | /opt/tomcat/log/catalina.log | CALLEE | LOG FILE | 2015/08/24 14:00:00 |
| 5 | SERVER 4 | /var/log/storage.log | CALLEE | LOG FILE | 2015/08/24 14:00:00 |
| 6 | SERVER 1 | /var/log/mysqld.log | CALLER | LOG FILE | 2015/08/24 14:00:00 |
| 7 | SERVER 1 | /var/lib/mysql/ib_logfile | CALLER | LOG FILE CANDIDATE | 2015/08/24 14:00:00 |

Fig. 19

| SEQUENCE NUMBER | SERVER NAME | FILE NAME | SERVER ATTRIBUTE | FILE TYPE | UPDATE DATE AND TIME |
|---|---|---|---|---|---|
| 1 | SERVER 2 | /var/log/sample.log | ORIGIN | LOG FILE | 2015/08/24 14:00:00 |
| 2 | SERVER 2 | /var/log/error.log | ORIGIN | LOG FILE | 2015/08/24 14:00:00 |
| 3 | SERVER 3 | /opt/tomcat/log/catalina.out | CALLEE | LOG FILE_NOERROR | 2015/08/24 14:00:00 |
| 4 | SERVER 3 | /opt/tomcat/log/catalina.log | CALLEE | LOG FILE_NOERROR | 2015/08/24 14:00:00 |
| 5 | SERVER 1 | /var/log/mysqld.log | CALLER | LOG FILE | 2015/08/24 14:00:00 |
| 6 | SERVER 1 | /var/lib/mysql/ib_logfile | CALLER | LOG FILE CANDIDATE | 2015/08/24 14:00:00 |
| 7 | SERVER 4 | /var/log/storage.log | CALLEE | LOG FILE_NOERROR | 2015/08/24 14:00:00 |

Fig. 22

SERVER 1                                                        71

| PID | LOCAL PORT NUMBER | DESTINATION | DESTINATION PORT NUMBER |
|-----|-------------------|-------------|-------------------------|
| 100 | 80                | –           | –                       |
| 101 | 33894             | SERVER 2    | 8080                    |

SERVER 2                                                        72

| PID | LOCAL PORT NUMBER | DESTINATION | DESTINATION PORT NUMBER |
|-----|-------------------|-------------|-------------------------|
| 200 | 8080              | –           | –                       |
| 201 | 48940             | SERVER 3    | 3306                    |
| 201 | 8080              | SERVER 1    | 33894                   |

SERVER 3                                                        73

| PID | LOCAL PORT NUMBER | DESTINATION | DESTINATION PORT NUMBER |
|-----|-------------------|-------------|-------------------------|
| 301 | 3306              | –           | –                       |
| 301 | 3306              | SERVER 2    | 48940                   |

FILE INFORMATION COLLECTION SYSTEM AND METHOD, AND STORAGE MEDIUM

This application is a National Stage Entry of PCT/JP2016/085754 filed on Dec. 1, 2016, which claims priority from Japanese Patent Application 2015-237675 filed on Dec. 4, 2015, the contents of all of which are incorporated herein by reference, in their entirety.

TECHNICAL FIELD

The present invention relates to a file information collection system, a file information collection method, and a file information collection program. When an alert occurs in any server belonging to a system in operation, the collection system, the collection method, and the collection program collect information about a file opened by a process from a server belonging to the system. The collection system, the collection method, and the collection program further generate a list of a file name of a log file related to the alert.

BACKGROUND ART

PTL 1 describes a system collecting an error log when a failure occurs and performing information analysis. The system described in PTL 1 reads a collection target product definition and incorporates a log file being a collection target into the system. The collection target product definition predefines a log file storage destination for each log collection target product. In other words, the system described in PTL 1 collects a log file a storage destination of which is preset, from the storage destination.

CITATION LIST

Patent Literature

PTL 1: Japanese Unexamined Patent Application Publication No. 2003-216457

SUMMARY OF INVENTION

Technical Problem

In general, a log file is output to a directory based on a software setting.

In recent years, systems have grown huge, and setting work of each software installed on each server included in a system is specialized. Further, increase in system size leads to increase in software types. Consequently, it is difficult for a system operator to grasp every log file in the system.

Furthermore, a log file used for failure analysis has a characteristic that the file is referred to only when a failure occurs and is not normally referred to. It is difficult to grasp a directory or the like in which a log file with a low reference frequency is stored, and therefore it tends to be very difficult for a system operator to grasp each log file.

When an alert occurs in any server belonging to a system in operation, collection of an appropriate log file is required for failure analysis. However, as described above, it is difficult for a system operator to grasp every log file, and therefore it is also difficult for the operator to determine an appropriate log file for failure analysis depending on the alert.

The system described in PTL 1 needs to predefine a storage destination of a log file. However, since it is difficult for a system operator to grasp every log file, definition of a storage destination of each log file in itself is difficult.

Accordingly, an object of the present invention is to provide a file information collection system, a file information collection method, and a file information collection program. The collection system, the collection method, and the collection program are able to determine an appropriate log file for failure analysis in a case that an alert occurs in any server belonging to a system in operation, or the like. The collection system, the collection method, and the collection program are further able to generate a list of a file name of the file.

Solution to Problem

A file information collection system according to the present invention includes: information acquisition means that, when a process is identified, acquires, from a server on which the identified process operates, a process ID of each process, and a file name and a file attribute of each file used by the each process, in a plurality of processes in parent-child relationships with the identified process, the processes including a process called by the identified process and a process being a caller of the identified process; list generation means that selects a file the file name of which meets a predetermined condition, the file attribute of the file being writable or readable/writable, generates, with the selected file as a target, a list of a record including identification information of a server outputting the file, the file name, and a server attribute of a server outputting the file, and, when generating a list by identifying a new process, adds the list at a bottom of an already-generated list; and sequence control means that selects the record from a top of the list one by one in a sequential order, acquires information about an update time of a file related to the selected record from a server outputting the file, and, when the update time precedes a reference time specified by a user, changes a server attribute in the selected record to predetermined information and moves the record to a bottom of the list.

A file information collection method according to the present invention includes: when a process is identified, acquiring, from a server on which the identified process operates, a process ID of each process, and a file name and a file attribute of each file used by the each process, in a plurality of processes in parent-child relationships with the identified process, the processes including a process called by the identified process and a process being a caller of the identified process; selecting a file the file name of which meets a predetermined condition, the file attribute of the file being writable or readable/writable, generating, with the selected file as a target, a list of a record including identification information of a server outputting the file, the file name, and a server attribute of a server outputting the file, and, when generating a list by identifying a new process, adding the list at a bottom of an already-generated list; and selecting the record from a top of the list one by one in a sequential order, acquiring information about an update time of a file related to the selected record from a server outputting the file, and, when the update time precedes a reference time specified by a user, changing a server attribute in the selected record to predetermined information and moving the record to a bottom of the list.

A file information collection program according to the present invention for causing a computer to provide functions. The function of the program includes: when a process is identified, acquiring, from a server on which the identified process operates, a process ID of each process, and a file name and a file attribute of each file used by the each process, in a plurality of processes in parent-child relationships with the identified process, the processes including a process called by the identified process and a process being a caller of the identified process; selecting a file the file name of which meets a predetermined condition, the file attribute of the file being writable or readable/writable, generating, with the selected file as a target, a list of a record including identification information of a server outputting the file, the file name, and a server attribute of a server outputting the file, and, when generating a list by identifying a new process, adding the list at a bottom of an already-generated list; and selecting the record from a top of the list one by one in a sequential order, acquiring information about an update time of a file related to the selected record from a server outputting the file, and, when the update time precedes a reference time specified by a user, changing a server attribute in the selected record to predetermined information and moving the record to a bottom of the list. The program may be stored in a storage medium.

Advantageous Effects of Invention

The present invention is able to determine an appropriate log file for failure analysis in a case that an alert occurs in any server belonging to a system in operation, or the like, and generate a list of a file name of the file.

BRIEF DESCRIPTION OF DRAWINGS

FIG. 8 is a diagram illustrating an example of process IDs and the like of processes operating on each server, and file names and the like of files opened by the processes.

FIG. 9 is a diagram illustrating an example of a list.
FIG. 10 is a diagram illustrating an example of a list.
FIG. 11 is a diagram illustrating an example of a list.
FIG. 13 is a diagram illustrating an example of a list.
FIG. 14 is a diagram illustrating an example of a list.
FIG. 17 is a flowchart illustrating an example of processing progression according to the second example embodiment of the present invention.
FIG. 18 is a diagram illustrating an example of a list.
FIG. 19 is a diagram illustrating an example of a list.
FIG. 22 is a diagram illustrating an example of communication record information generated by each server.

DESCRIPTION OF EMBODIMENTS

Example embodiments of the present invention will be described below with reference to drawings.

First Example Embodiment

Figure 1:
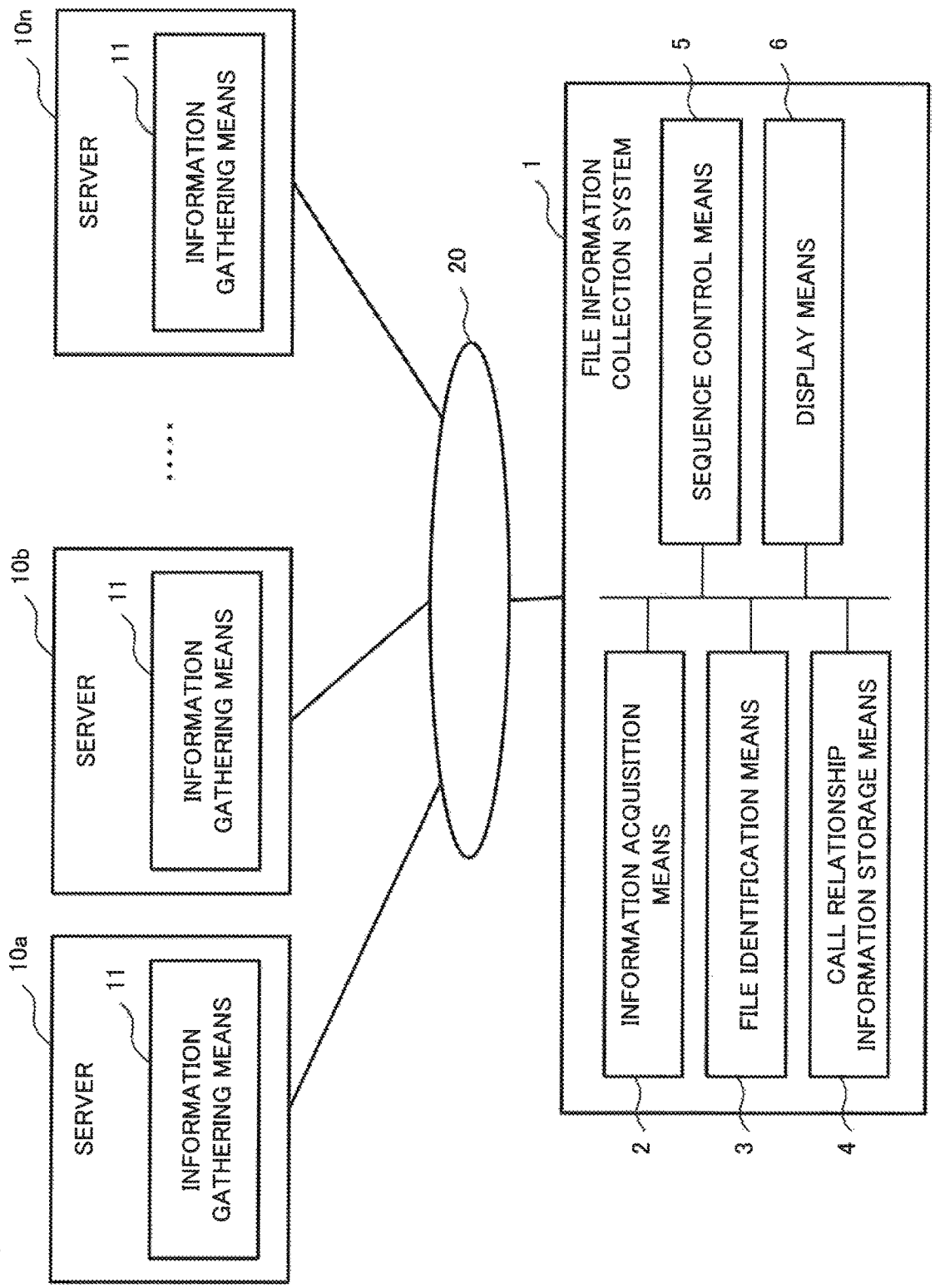
FIG. 1 is a block diagram illustrating a configuration example of a file information collection system according to a first example embodiment of the present invention.

FIG. 1 is a block diagram illustrating a configuration example of a file information collection system according to a first example embodiment of the present invention.

FIG. 1 illustrates not only the file information collection system but also servers $10a$ to $10n$ belonging to a system used for a predetermined purpose. A process operating on a server may call a process operating on another server. In this case, a call relationship is established between the processes operating on the different servers. A calling process is hereinafter referred to as a "caller," and a called process is referred to as a "callee." When an error occurs in any server, the error extends to a caller server viewed from the server. Note that, while a server outputs an alert with occurrence of an error, the server outputting the alert is not necessarily a server in which the error initially occurs.

Each of the servers $10a$ to $10n$ includes an information gathering means 11. The information gathering means 11 gathers information requested by the file information collection system 1 and transmits the information to the file information collection system 1.

Each of the servers $10a$ to $10n$ and the file information collection system 1 are connected through, for example, a network 20.

The file information collection system 1 includes an information acquisition means 2, a file identification means 3, a call relationship information storage means 4, a sequence control means 5, and a display means 6.

When any server outputs an alert in the system (the system including the servers $10a$ to $10n$) in operation, an administrator of the file information collection system 1 generates information (hereinafter referred to as origin information) including the following. The information includes identification information of the server and a process name of a process outputting the alert in the server. The origin refers to the server outputting the alert. Further, it is assumed in the following description that a server name is used as the identification information of the server. Further, the administrator also includes information about an output time of the alert in the origin information. The output time of the alert is hereinafter referred to as a reference time. When generating the origin information, the administrator inputs the origin information to the file information collection system 1.

A process identified by origin information or a process newly identified based on a call relationship with an already-identified process is referred to as an identified process. An initial identified process is a process identified by a process name included in the origin information.

Let us assume that origin information including a server name, a process name, and a reference time is input to the information acquisition means 2. Then, by requesting a process identification (ID) of each process to a server on which a process (an identified process) identified by the process name operates, the information acquisition means 2 acquires the process ID of the each process from the server. The each process is represented in a tree structure indicating a parent-child relationship between processes including the identified process. The information gathering means 11 in the server may transmit the process ID of the each process requested by the information acquisition means 2 to the information acquisition means 2. Further, the information acquisition means 2 may acquire a process name of the each process along with the process ID of the each process. When a process generates another process, it is determined that a parent-child relationship is established between the processes, and the generated process is called a child, and the process generating the child is called a parent.

A mode of the information acquisition means 2 acquiring a process ID of each process represented in a tree structure indicating a parent-child relationship between processes including an identified process is not particularly limited. For example, the information acquisition means 2 may specify a process name. Then, the information acquisition means 2 may acquire process information including a process ID of a process with the process name, the process name, and a process ID (a process ID of a parent or a child) of a process in a parent-child relationship with the process. Then, the information acquisition means 2 may repeat specifying a process ID of a parent or a child and acquiring process information related to the process ID, until a tree structure of the parent-child relationship is obtained.

Further, when a process ID of each process represented by a tree structure indicating a parent-child relationship between processes including an identified process can be acquired with a single request, the information acquisition means 2 may acquire the process ID of the each process with the single request.

Figures 2, 3:
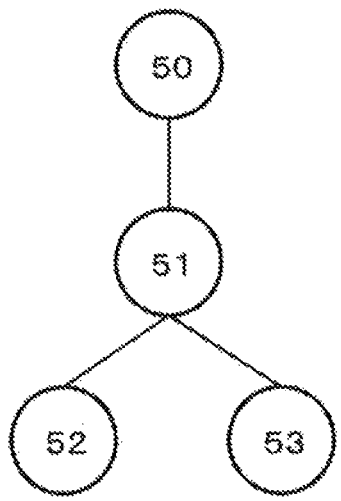
FIG. 2 is a schematic diagram illustrating an example of a tree structure indicating a parent-child relationship between processes.
FIG. 3 is a diagram illustrating an example of an "include" condition and an "exclude" condition.

FIG. 2 is a schematic diagram illustrating an example of a tree structure indicating a parent-child relationship between processes. It is assumed that each node illustrated in FIG. 2 represents a process, and a number assigned to each node indicates a process ID. For example, when a process ID of a process with a process name included in origin information (an identified process) is "53," and a tree structure indicating a parent-child relationship between processes including the identified process is the tree structure exemplified in FIG. 2, the information acquisition means 2 acquires process IDs "50," "51," "52," and "53" of respective processes represented in the tree structure. A group of processes including such a parent-child relationship execute processing together.

Further, by requesting a file name and a file attribute of each file opened by each process (each process represented in the tree structure) related to each acquired process ID to a server on which the identified process operates, the information acquisition means 2 acquires a file name and a file attribute of the each file from the server. The information gathering means 11 in the server may transmit each file name and file attribute requested by the information acquisition means 2 to the information acquisition means 2.

Each file name is described including a path from a root directory such as "/var/log/error.log."

File names acquired by the information acquisition means 2 include a file name of a log file and file names of various files other than a log file.

Further, the file attribute refers to an attribute specified when a file is opened. The file attribute indicates one of writable, readable, and readable/writable.

The file identification means 3 determines a file name of a log file out of file names acquired by the information acquisition means 2 and generates a list of the file name. As an example, a case that the file identification means 3 also includes a file that cannot be determined to be a log file but is possibly a log file (hereinafter referred to as a log file candidate) in the list will be described, according to the present example embodiment.

Out of file names acquired by the information acquisition means 2, the file identification means 3 selects a file name a related file attribute of which is writable or readable/writable. The reason is that a file attribute of a log file into which information about an error is written is writable or readable/writable.

A file name a related file attribute of which is readable does not fall under a log file, and therefore the file identification means 3 discards such a file name without selection.

A set of file names selected by the file identification means 3 may include a plurality of identical file names. The reason is that different processes may open an identical file, and therefore overlapping acquisition of a file name of the identical file by the information acquisition means 2 may occur.

When a set of selected file names include a plurality of identical file names, the file identification means 3 eliminates the overlap. Specifically, when there are a plurality of identical file names, the file identification means 3 keeps one from the file names and discards the remainder.

Furthermore, when a file name meets a predetermined condition, the file identification means 3 determines the file to be a file name of a log file. The predetermined condition is expressed as a combination of an "include" condition and an "exclude" condition. The "include" condition is a condition that a file name includes at least a character string "log" in a predetermined format. The "exclude" condition is a condition that a file name includes a character string not used for a log file. FIG. 3 illustrates an example of the "include" condition and the "exclude" condition. In the example illustrated in FIG. 3, the "include" condition and the "exclude" condition are expressed in a regular expression. A character string "log[s]" indicated in FIG. 3 denotes a character string "log" or "logs." In the example illustrated in FIG. 3, a character string "[.+]" denotes any character string composed of "." and one or more characters. A character string ".*" denotes any character string composed of "." and zero or more characters. A file name including a character string "/dev/" is considered not a log file. Accordingly, in the example illustrated in FIG. 3, a character string "/dev/.*" is indicated as an example of the "exclude" condition.

When a file name meets a condition that 'the "include" condition is met and the "exclude" condition is not met,' the file identification means 3 determines that the file name is a file name of a log file.

Further, when a file name meets a condition that 'neither the "include" condition nor the "exclude" condition is met,' the file identification means 3 determines that the file name is a file name of a log file candidate.

The "include" condition and the "exclude" condition are not limited to the example illustrated in FIG. 3.

The file identification means 3 generates a record for each file name determined to be a file name of a log file or a log file candidate, and generates a list of the record. Each record includes information about a server name, a file name, and a server attribute of a server outputting the file. As an example, a case that each record also includes a file type will be described, according to the present example embodiment. Further, as an example, a case that a "file type" includes two types being a "log file" and a "log file candidate" will be described, according to the present example embodiment. In the following description, a server outputting a file refers to a server generating or updating a file, and keeping the file in the server.

The server attribute indicates a server on which an initial identified process (i.e. a process identified by origin information) operates (hereinafter referred to as an origin server), a server on a callee side viewed from the origin server, or a server on a caller side viewed from the origin server. Further, as will be described later, a record in a list may be moved to the bottom of the list. In this case, a server attribute in the record moved to the bottom of the list is rewritten with a predetermined information (a character string "reference" in the example according to the present example embodiment) meaning that the record is moved to the bottom of the list.

Figure 4:
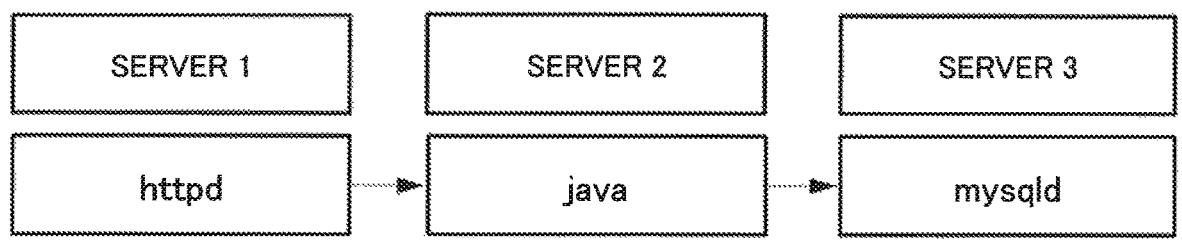
FIG. 4 is a schematic diagram illustrating an example of call relationship information.

The call relationship information storage means 4 is a storage device storing call relationship information. The call relationship information refers to information indicating which process calls which process in another server. FIG. 4 is a schematic diagram illustrating an example of call relationship information. The call relationship information exemplified in FIG. 4 illustrates relationships of a process "httpd" in a server 1 calling a process "java" in a server 2 and the process "java" in the server 2 calling a process "mysqld" in a server 3. The following description assumes that "server 1," "server 2," and "server 3" denote server names. Then, for example, a server with a server name "server 1" is simply referred to as a server 1. An administrator previously generates call relationship information and stores the information in the call relationship information storage means 4. While FIG. 4 exemplifies a case that there are three processes having call relationships, the number of processes having call relationships is not limited to three. For example, another process may further exist on a callee side of "mysqld." Similarly, another process may exist on a caller side of "httpd."

When the file identification means 3 generates a list, based on an identified process, the information acquisition means 2 newly sets an identified process. At this time, the information acquisition means 2 sets a process called by the identified process as a new identified process. However, when a process called by an identified process no longer exists, the information acquisition means 2 sets a process being a caller of an initial identified process (a process identified by origin information) as a new identified process. Subsequently, the information acquisition means 2 successively sets a process being a caller of an identified process as a new identified process until a process being a caller no longer exists. By referring to call relationship information, the information acquisition means 2 may determine a process called by another process and a process being a caller of another process.

When an identified process is newly set, the file identification means 3 generates a list similarly to the above. Then, the file identification means 3 adds the newly generated list to the bottom of an already-generated list.

When a new identified process no longer exists, the sequence control means 5 manipulates a sequence of records in a list obtained at that point. The sequence control means 5 selects records from the top of the list one by one in a sequential order. The sequence control means 5 acquires information about an update time of a file related to a selected record from a server outputting the file. At this time, the sequence control means 5 requests the information about the update time of the file to the information gathering means 11 in the server. Then, the information gathering means 11 may transmit the requested information about the update time to the sequence control means 5. The sequence control means 5 determines whether or not the update time acquired from the server is a time before a reference time (a reference time included in the origin information) specified by the administrator. When the update time acquired from the server is a time before the reference time, the sequence control means 5 rewrites a server attribute in the selected record with "reference" and moves the record to the bottom of the list. The attribute "reference" refers to the record being moved to the bottom of the list. Further, when the update time acquired from the server is a time at or after the reference time, the sequence control means 5 does not change a content and a sequence number of the record. The sequence control means 5 may use a file size as a determination criterion for whether or not to move the record to the bottom of the list.

The sequence control means 5 selects records one by one in a sequential order and performs the processing described above until an unselected record no longer exists.

Subsequently to the processing by the sequence control means 5, the display means 6 displays a file name included in the list for each server. At this time, the sequence control means 5 changes a display mode of a file name depending on a server attribute. As an example, a case that the sequence control means 5 changes a display mode not only by a server attribute but also by a file type will be described, according to the present example embodiment.

For example, the information acquisition means 2, the file identification means 3, the sequence control means 5, and the display means 6 are provided by a central processing unit (CPU) in a computer including a display device. In this case, the CPU may read a file information collection program from a program recording medium such as a program storage device (unillustrated) in the computer. Then, the CPU may operate as the information acquisition means 2, the file identification means 3, the sequence control means 5, and the display means 6, in accordance with the program. A part determining displayed information in the display means 6 is provided by the CPU. A part actually performing display in the display means 6 is provided by the display device. The same holds for other example embodiments to be described later.

Further, the information acquisition means 2, the file identification means 3, the sequence control means 5, and the display means 6 may be respectively provided by separate pieces of hardware.

Figure 5:
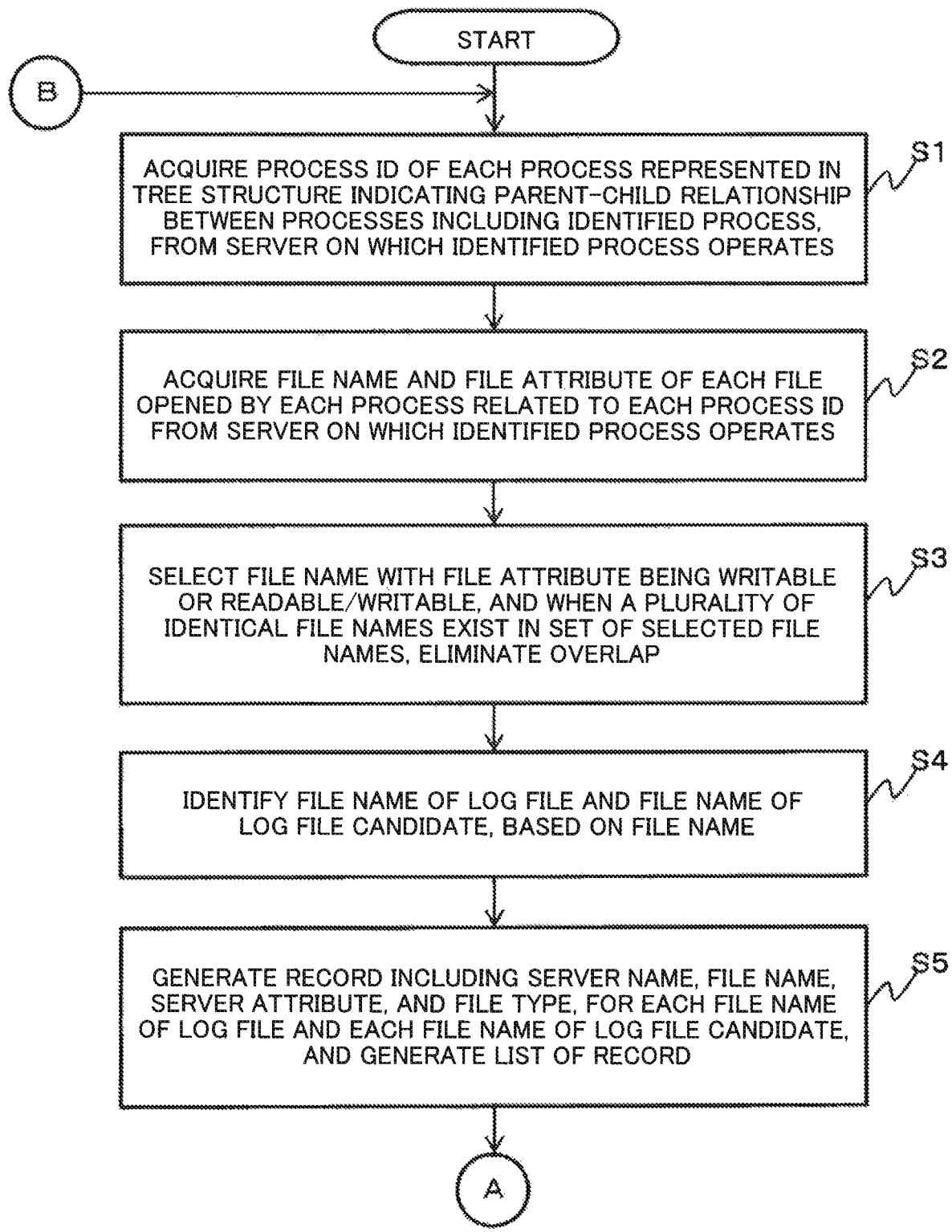
FIG. 5 is a flowchart illustrating an example of processing progression according to the first example embodiment of the present invention.
Figure 6:
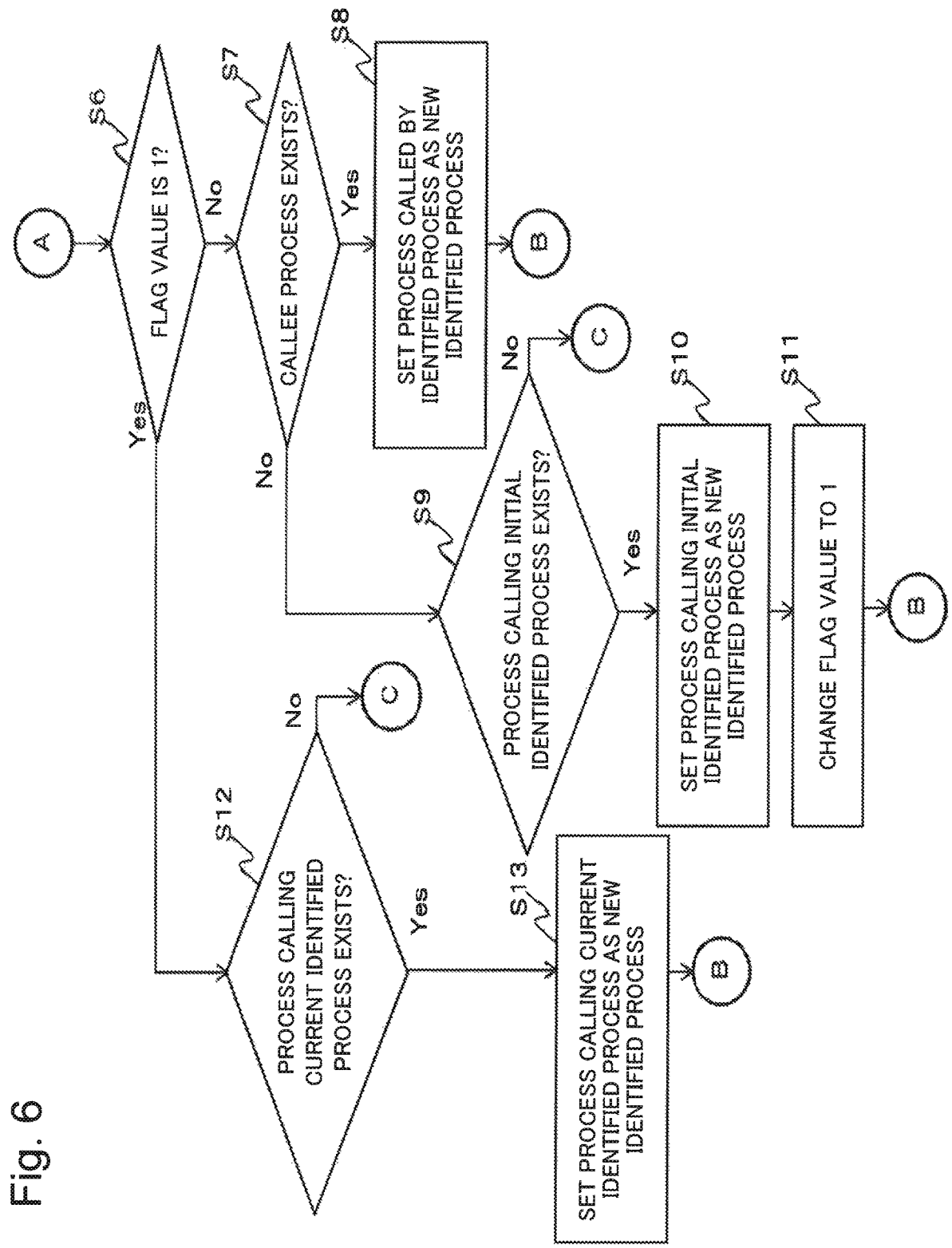
FIG. 6 is a flowchart illustrating an example of processing progression according to the first example embodiment of the present invention.
Figure 7:
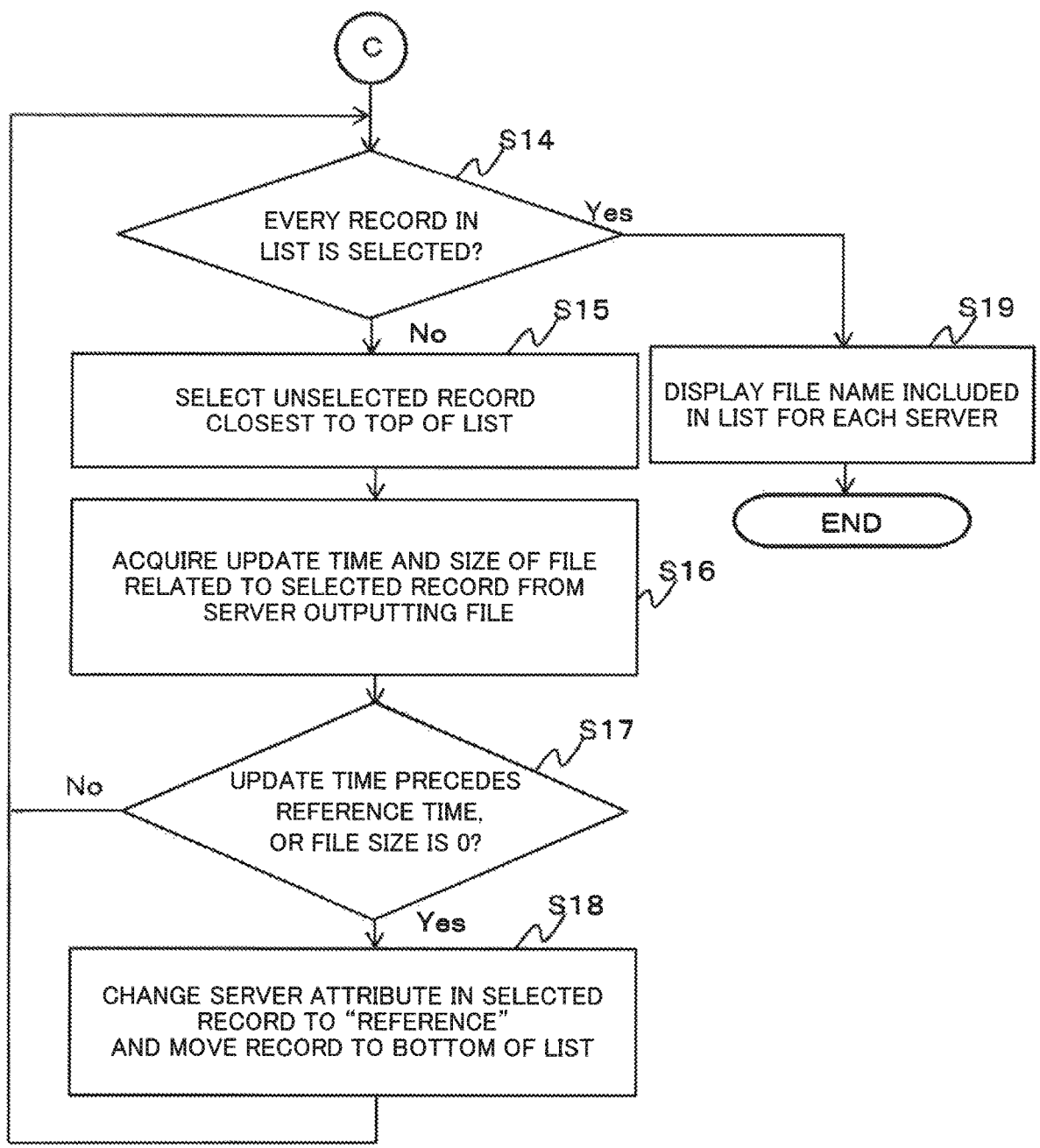
FIG. 7 is a flowchart illustrating an example of processing progression according to the first example embodiment of the present invention.

Next, processing progression according to the first example embodiment will be described. FIGS. 5, 6, and 7 are flowcharts illustrating an example of processing progression according to the first example embodiment of the present invention.

When origin information is input by an administrator, the file information collection system 1 according to the present invention executes processing from Step S1. In the following example, a case that the administrator prestores in the call relationship information storage means 4 call relationship information exemplified in FIG. 4 will be described as an example. Further, in the following description, a case that a process outputting an alert is "java" exemplified in FIG. 4 will be described as an example. Further, a case that the origin information input by the administrator includes a server name "server 2," a process name "java," and a reference time "2015/8/24 13:00:00" will be described as an example.

Further, in the following description, a case that process IDs and the like of the processes respectively operating on the servers 1 to 3 illustrated in FIG. 4, and file names and file attributes of files opened by the processes are indicated as exemplified in FIG. 8 will be described as an example. Note that FIG. 8 illustrates the respective processes represented in a tree structure including the processes illustrated in FIG. 4. As exemplified in FIG. 8, a process ID may be expressed as a PID. Further, a "parent PID" refers to a process ID of a parent process. A "parent PID" being "0" means that a parent process does not exist. Further, in the following description, a file attribute writable may be denoted by "W," a file attribute readable by "R," and a file attribute readable/writable by "W/R."

Further, in the following description, a case that, when determining a file name of a log file and a file name of a log file candidate, the file identification means 3 uses the "include" condition and the "exclude" condition exemplified in FIG. 3 will be described as an example.

The information acquisition means 2 acquires a process ID of each process represented in a tree structure indicating a parent-child relationship between processes including an identified process from a server on which the identified process operates (Step S1).

In Step S1 executed immediately after input of the origin information, a process identified by a process name included in the origin information becomes an identified process. Further, in Step S1 executed immediately after the input of the origin information, a server identified by a server name included in the origin information is a server on which the identified process operates.

For example, by specifying the process name "java," the information acquisition means 2 acquires process information from the server 2. The process information includes a process ID of a process with the process name, the process name, and a process ID of a process in a parent-child relationship with the process (a process ID of a parent or a child). Then, the information acquisition means 2 may repeat specifying a process ID of a parent or a child, and acquiring process information related to the process ID from the server 2, until a tree structure of the parent-child relationship is obtained. Thus, the information acquisition means 2 may acquire a process name and the like in addition to a process ID.

In this example, the information acquisition means 2 acquires information 52 exemplified in FIG. 8 from the server 2.

Next, the information acquisition means 2 acquires a file name and a file attribute of each file opened by each process related to each process ID acquired in Step S1 from a server on which the identified process operates (Step S2).

In this case, the information acquisition means 2 acquires from the server 2 a file name and a file attribute of each file opened by a process with a process ID being 200 (referring to FIG. 8). Similarly, the information acquisition means 2 also acquires from the server 2 information about each file opened by a process with a process ID being 201 and information about each file opened by the process with the process ID being 201.

In this example, the information acquisition means 2 acquires information 55 exemplified in FIG. 8 from the server 2. Each piece of information 54 to 56 includes a set of a process ID, a file name, and a file attribute. In the information 55 exemplified in FIG. 8, file names and file attributes related to process IDs "201" and "202" are not included. The above means that processes related to the process IDs "201" and "202" do not open files.

Next, out of the file names acquired in Step S2, the file identification means 3 selects a file name with a file attribute being writable or readable/writable. Additionally, when a set of the selected file name includes a plurality of identical file names, the file identification means 3 eliminates the overlap (Step S3).

In this example, the file identification means 3 selects each of the first to fourth file names out of the respective file names indicated as the information 55 in FIG. 8. Further, since the four file names do not overlap one another, the file identification means 3 does not need to perform overlap elimination.

Next, based on the respective file names obtained as a result of Step S3, the file identification means 3 identifies a file name of a log file and a file name of a log file candidate from the respective file names (Step S4).

Each of the first to fourth file names in the information 55 indicated in FIG. 8 meets a condition that 'the "include" condition is met and the "exclude" condition is not met.' Accordingly, the file identification means 3 determines that every one of the four file names is a file name of a log file. A file name of a log file candidate does not exist in the four file names.

Next, the file identification means 3 generates a record including a server name, a file name, a server attribute, and a file type for each file name of a log file and each file name of a log file name candidate, and generates a list of the record (Step S5).

In this example, the file identification means 3 generates a list exemplified in FIG. 9. Since the server 2 is an origin server, a server attribute in each record listed in FIG. 9 is "origin." Further, based on the result of Step S4, a "file type" is "log file" for every record.

When previously executing Step S5, the file identification means 3 adds the newly generated list at the bottom of an already-generated list.

In this case, the processing is in a state of transitioning to Step S5 for the first time after the input of the origin information, and therefore an existing list does not exist. Accordingly, the file identification means 3 may generate the list illustrated in FIG. 9.

When a record of a log file candidate exists in the list (in a case of adding a new list to an existing list, the list after the addition), the file identification means 3 moves the record to the bottom of the list.

After Step S5, the information acquisition means 2 determines whether or not a value of a flag indicating whether or not a current identified process is a process on a caller side of an initial identified process (a process identified by the origin information) (hereinafter simply referred to as a flag) is 1 (Step S6). An initial value of the flag is 0. The flag value being 1 means that the current identified process is a process on a caller side of the initial identified process. The flag value being 0 means that the current identified process is not a process on a caller side of the initial identified process.

The information acquisition means 2 transitions to Step S12 when the flag value is 1 (Yes in Step S6) and transitions to Step S7 when the flag value is 0 (No in Step S6). In this case, since the flag value is the initial value "0," the information acquisition means 2 transitions to Step S7.

In Step S7, the information acquisition means 2 determines whether or not a process being a callee of the current identified process exists, based on the call relationship information (referring to FIG. 4) (Step S7). The information acquisition means 2 transitions to Step S8 when a process being a callee of the current identified process exists (Yes in Step S7) and transitions to Step S9 when the process does not exist (No in Step S7). In this case, since a process ("mysqld") being a callee of the current identified process exists, the information acquisition means 2 transitions to Step S8.

In Step S8, the information acquisition means 2 sets a process called by the current identified process as a new identified process (Step S8). Further, the information acquisition means 2 refers to the call relationship information (referring to FIG. 4) and recognizes a server on which the new identified process operates. In this case, the information acquisition means 2 sets "mysqld" called by "java" as a new identified process. Further, the information acquisition means 2 recognizes that a server on which "mysqld" operates is the server 3.

After Step S8, the information acquisition means 2 transitions to Step S1 and repeats the operations in and after Step S1.

When "mysqld" becomes an identified process, the information acquisition means 2 acquires information 53 exemplified in FIG. 8 from the server 3 in Step S1. Additionally, the information acquisition means 2 acquires information 56 exemplified in FIG. 8 from the server 3 in Step S2.

In Step S3, the file identification means 3 selects the first, third, and fourth file names out of respective file names indicated as the information 56. Since the three file names do not overlap one another, the file identification means 3 does not need to perform overlap elimination.

Out of the respective file names obtained as a result of Step S3, "/dev/null" does not meet the condition that 'the "include" condition is met and the "exclude" condition is not met.' The file name "/dev/null" does not meet the condition that 'neither the "include" condition nor the "exclude" condition is met' either.

Further, "/var/log/mysqld.log" meets the condition that 'the "include" condition is met and the "exclude" condition is not met.'

Further, "/var/lib/mysql/ib_logfile" meets the condition that 'neither the "include" condition nor the "exclude" condition is met.'

Accordingly, in Step S4, the file identification means 3 determines that "/dev/null" falls under neither a log file nor a log file candidate. Further, the file identification means 3 determines that "/var/log/mysqld.log" is a file name of a log file, and "/var/lib/mysql/ib_logfile" is a file name of a log file candidate.

In next Step S5, the file identification means 3 generates a list including a record for "/var/log/mysqld.log" and a record for "/var/lib/mysql/ib_logfile." Server attributes in the records are all "callee." Further, a file type in the record for "/var/log/mysqld.log" is "log file." A file type in the record for "/var/lib/mysql/ib_logfile" is "log file candidate."

In this case, an existing list (the list generated in the last Step S5, referring to FIG. 9) exists. Accordingly, the file identification means 3 adds the newly generated list at the bottom of the existing list. Consequently, a list illustrated in FIG. 10 is obtained.

Next, the information acquisition means 2 determines whether or not the flag value is 1 (Step S6). In this case, the flag value is 0, and therefore the information acquisition means 2 transitions to Step S7.

The information acquisition means 2 determines whether or not a process being a callee of the current identified process ("mysqld") exists, based on the call relationship information (Step S7). In this example, a process being a callee of "mysqld" does not exist (referring to FIG. 4), and therefore the information acquisition means 2 transitions to Step S9. When a process being a callee of "mysqld" exists, the information acquisition means 2 may execute the processing in and after Step S8 again.

In Step S9, the information acquisition means 2 determines whether or not a process calling the initial identified process ("java") exists, based on the call relationship information (referring to FIG. 4) (Step S9). When a process calling the initial identified process ("java") exists (Yes in Step S9), the information acquisition means 2 transitions to Step S10, and when such a process does not exist (No in Step S9), transitions to Step S14. For example, when "httpd" indicated in FIG. 4 is described in the origin information, the information acquisition means 2 transitions from Step S9 to Step S14. In this case, the process "httpd" calling the initial identified process ("java") exists, and therefore the information acquisition means 2 transitions to Step S10.

In Step S10, the information acquisition means 2 sets a process calling the initial identified process ("java") as a new identified process (Step S10). In this case, the information acquisition means 2 sets "httpd" calling "java" as a new identified process. Further, the information acquisition means 2 recognizes that a server on which "httpd" operates is the server 1.

Next, the information acquisition means 2 changes the flag value to 1 (Step S11).

After Step S11, the information acquisition means 2 transitions to Step S1 and repeats the operations in and after Step S1.

When "httpd" becomes an identified process, the information acquisition means 2 acquires information 51 exemplified in FIG. 8 from the server 1 in Step S1. Additionally, the information acquisition means 2 acquires information 54 exemplified in FIG. 8 from the server 1 in Step S2.

In Step S3, the file identification means 3 selects the first, second, fourth, fifth, seventh, and eighth file names out of respective file names indicated as the information 54. Out of the files, the first, fourth, and seventh file names ("/var/log/access.log") overlap one another, and therefore the file identification means 3 eliminates the overlap. For example, the file identification means 3 discards the fourth and seventh file names and keeps the first one only. Similarly, since the second, fifth, and eighth file names ("/var/log/error.log") overlap one another, the file identification means 3 discards the overlap.

The two file names ("/var/log/access.log" and "/var/log/error.log") obtained as a result meet the condition that 'the "include" condition is met and the "exclude" condition is not meet.' Accordingly, the file identification means 3 determines that both of the two file names are file names of log files (Step S4).

In next Step S5, the file identification means 3 generates a list including a record for "/var/log/access.log" and a record for "/var/log/error.log." Server attributes in the records are all "caller." Further, file types in the records are all "log file."

Furthermore, the file identification means 3 adds the list at the bottom of the existing list (referring to FIG. 10). Further, the file identification means 3 moves the record for the log file candidate to the bottom of the list. Consequently, a list illustrated in FIG. 11 is obtained.

Next, the information acquisition means 2 determines whether or not the flag value is 1 (Step S6). In this case, the flag value is 1, and therefore the information acquisition means 2 transitions to Step S12.

In Step S12, the information acquisition means 2 determines whether or not a process calling the current identified process ("httpd") exists, based on the call relationship information (referring to FIG. 4) (Step S12).

When a process calling the current identified process exists (Yes in Step S12), the information acquisition means 2 sets the process calling the current identified process as a new identified process (Step S13). At this time, the information acquisition means 2 also recognizes a server on which the process operates. Subsequently, the information acquisition means 2 transitions to Step S1 and repeats the operations in and after Step S1.

When a process calling the current process does not exist (No in Step S12), the information acquisition means 2 transitions to Step S14. In this example, a process calling "httpd" does not exist, therefore the information acquisition means 2 transitions to Step S14.

In Step S14, the sequence control means 5 determines whether or not every record in the generated list (referring to FIG. 11) is selected (Step S14).

When an unselected record remains (No in Step S14), the sequence control means 5 selects an unselected record closest to the top of the list (Step S15). For example, when transitioning to Step S15 for the first time, the sequence control means 5 selects the first record in the list. As an example, a case that the first record listed in FIG. 11 is selected will be described.

Figure 12:
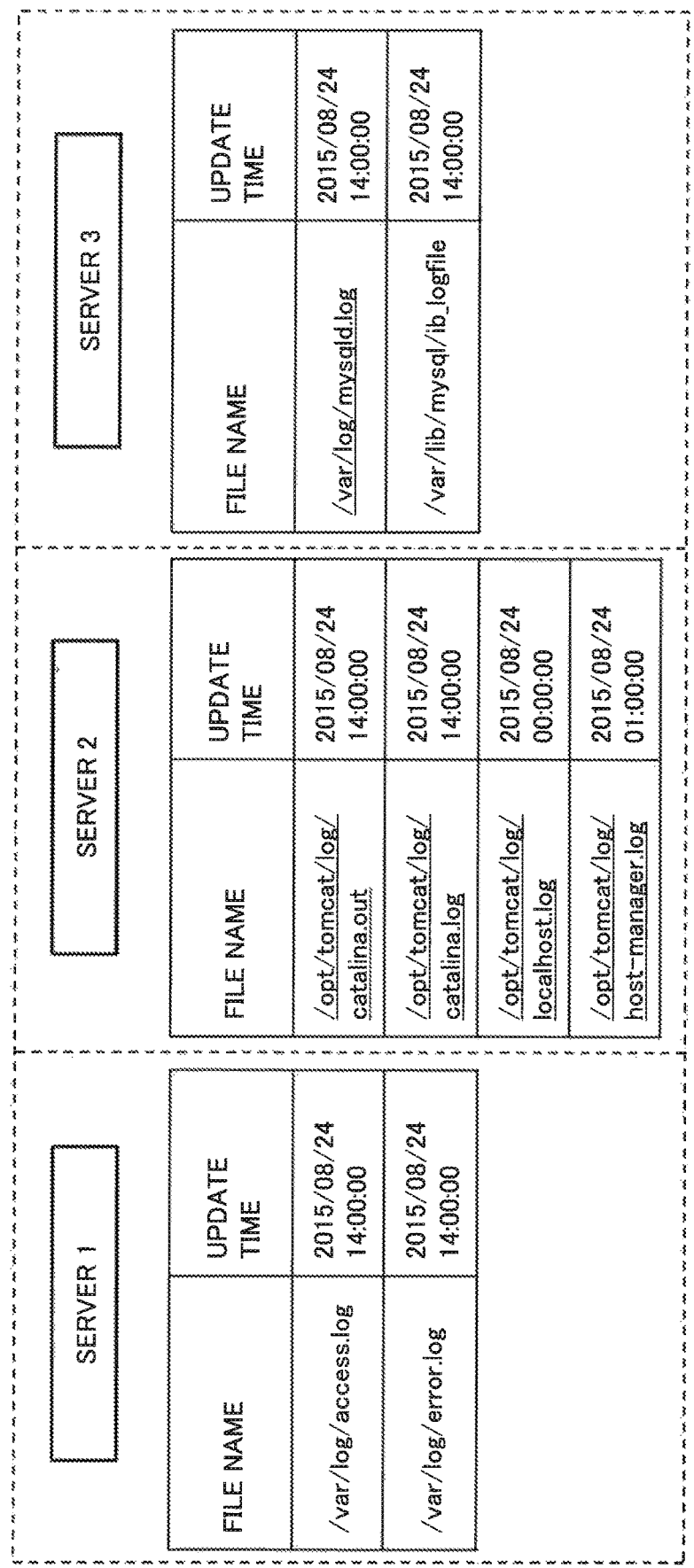
FIG. 12 is a diagram illustrating an example of update times of files.

Further, it is assumed that times at which the server 1, the server 2, and the server 3 update files with the respective file names listed in FIG. 11 are times exemplified in FIG. 12. Further, it is assumed that a size of each file listed in FIG. 11 is not 0, and the case will be described with a focus on an update time of a file.

After Step S15, the sequence control means 5 acquires information about an update time and a size of a file related to the selected record from a server outputting the file (Step S16). In this case, the sequence control means 5 acquires from the server 2 information about an update date and time, and a size of "/opt/tomcat/log/catalina.out." The sequence control means 5 may add the acquired information about the update date and time to the record selected in Step S15.

After Step S16, the sequence control means 5 determines whether or not the update time of the file related to the selected record is a time before the reference time and also determines whether or not a size of the file is 0 (Step S17). For ease of description, it assumed that a size of each file listed in FIG. 11 is not 0, as described above.

When the update time is before the reference time, or the file size is 0, (Yes in Step S17), the sequence control means 5 transitions to Step S18. Further, when the update time is a time at or after the reference time, and the file size is not 0 (No in Step S17), the sequence control means 5 repeats the processing in and after Step S14. An update date and time of "/opt/tomcat/log/catalina.out" is "2015/8/24 14:00:00" (referring to FIG. 12) and is a time at or after the reference time indicated by the input origin information "2015/8/24 13:00:00." Further, a file size of "/opt/tomcat/log/catalina.out" is not 0. Accordingly, in this case, the sequence control means 5 transitions from Step S17 to Step S14 and performs the processing in and after Step S14.

In a case of selecting the second record ("/opt/tomcat/log/catalina.log"), the sequence control means 5 transitions from Step S17 to Step S14.

Let us assume that the sequence control means 5 selects the third record ("/opt/tomcat/log/localhost.log") listed in FIG. 11 in Step S15. The sequence control means 5 acquires "2015/8/24 00:00:00" (referring to FIG. 12) as information about an update time of a file related to the record (Step S16).

Accordingly, the sequence control means 5 determines that the update time of "/opt/tomcat/log/localhost.log" is before the reference time (Yes in Step S17) and transitions to Step S18.

In Step S18, the sequence control means 5 rewrites a server attribute in the selected record with "reference" and moves the record to the bottom of the list (Step S18). Accordingly, the sequence control means 5 rewrites a server attribute in the third record listed in FIG. 11 with "reference" and moves the record to the bottom of the list. After Step S18, the sequence control means 5 transitions to Step S14 and performs the processing in and after Step S14.

An update time of the fourth record listed in FIG. 11 is "2015/8/24 01:00:00" and is a time before the reference time. Accordingly, the sequence control means 5 also transitions from Step S17 to Step S18 when selecting the fourth record illustrated in FIG. 11. Then, the sequence control means 5 rewrites a server attribute in the fourth record listed in FIG. 11 with "reference" and moves the record therefor to the bottom of the list. The list at this time is updated as illustrated in FIG. 13. Subsequently, the sequence control means 5 performs the processing in and after Step S14.

When selecting the last record ("/var/lib/mysql/ib_logfile") listed in FIG. 11 in Step S15, the sequence control means 5 returns from Step S17 to Step S14. Consequently, the list is updated as illustrated in FIG. 14.

When the sequence control means 5 transitions to Step S14 after selecting the last record ("/var/lib/mysql/ib_logfile") listed in FIG. 11, every record in the list is selected (Yes in Step S14). In this case, the sequence control means 5 transitions to Step S19.

While Step S17 has been described above with a main focus on update times, the sequence control means 5 also transitions to Step S18 when a size of the file acquired in Step S16 is 0. In other words, when a file size is 0, the sequence control means 5 rewrites a server attribute in the selected record with "reference" and moves the record to the bottom of the list.

In Step S19, the display means 6 displays each file name included in the list for each server (Step S19). At this time, the display means 6 changes a display mode of a file name depending on a server attribute. Further, the display means 6 may change a display mode of a file name not only by a server attribute but also by a file type. As an example, a case that the display means 6 changes a background of a file name display part depending on a server attribute and a file type will be described, according to the present example embodiment.

Figure 15:
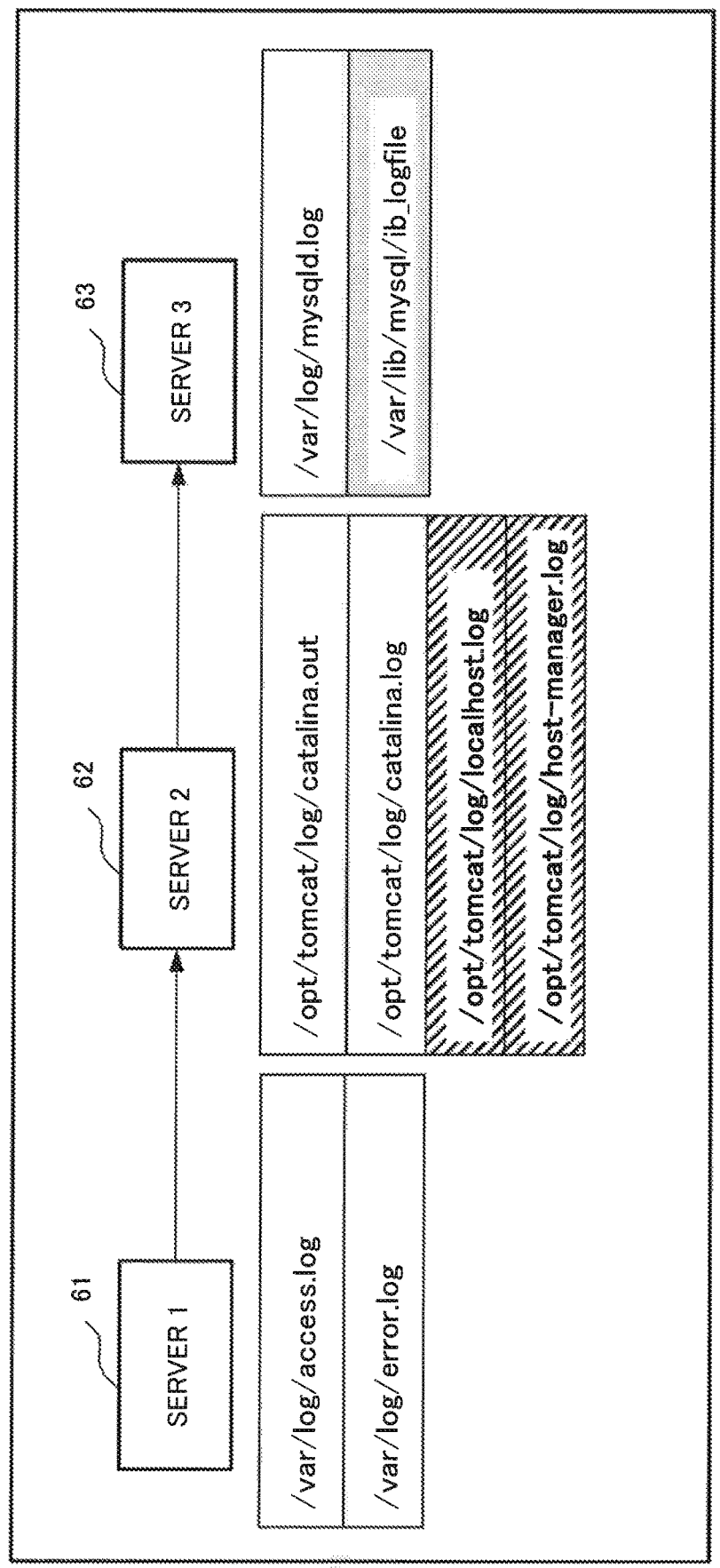
FIG. 15 is a diagram illustrating an example of a screen displayed by a display means.

FIG. 15 is a diagram illustrating an example of a screen displayed by the display means 6. A file name displayed on the screen is a file name included in the list. For example, the display means 6 displays icons 61 to 63 representing the respective servers. Then, the display means 6 displays a file name of a file output by a server close to an icon thereof. For example, the display means 6 displays a file name of a file output by the server 1 close to the icon 61 of the server 1. The same holds for the icons 62 and 63.

Further, the display means 6 sets a background of a file name in a record in which a server attribute is "reference" to a background different from a background of another file name. In the example illustrated in FIG. 15, a background of a file name in a record in which a server attribute is "reference" is hatched. Similarly, the display means 6 sets a background of a file name in a record in which a file type is "log file candidate" to a background different from a background of another file name. In the example illustrated in FIG. 15, a background of a file name (under the server 3) in a record in which a file type is "log file candidate" is grayed out.

Every file name displayed on the screen exemplified in FIG. 15 is a file name of a log file or a log file candidate. Accordingly, the administrator is able to grasp a file name of a log file or a log file candidate.

Further, a file for which a server attribute is "reference" is a file an update time of which is before the reference time (the output time of the alert) or a zero-sized file. A file an update time of which is before the reference time is considered to be less relevant to an error causing the alert output even when the file is a log file. Similarly, a zero-sized file is considered less relevant to the error causing the alert output even when the file is a log file. Accordingly, the files are less significant when analyzing the error causing the alert output. The screen exemplified in FIG. 15 enables the administrator to grasp file names of such less significant files. Further, a log file candidate may be considered less significant compared with a log file. The screen exemplified in FIG. 15 enables the administrator to grasp a log file and a log file candidate while distinguishing between the two.

The information acquisition means 2 according to the first example embodiment sets an identified process, based on origin information and call relationship information. Then, the information acquisition means 2 acquires a file name and a file attribute of each file opened by each process represented in a tree structure (a tree structure indicating a parent-child relationship) including the process. Then, the information acquisition means 2 selects a file name a file attribute of which is writable or readable/writable, and based on the file name, identifies a file name of a log file and a file name of a log file candidate. Additionally, the information acquisition means 2 generates a list of a record including a file name of a log file and a record including a file name of a log file candidate. Further, the sequence control means 5 moves a record including a file update time before a reference time and a record including a zero-sized file in the generated list to the bottom of the list.

Accordingly, a list of a file related to an error causing output of an alert is generated, and therefore an administrator is able to obtain a list of a file name of a log file appropriate for failure analysis without grasping every log file. Consequently, the administrator is able to grasp the log file appropriate for failure analysis.

Further, since a record including a file update time before the reference time and a record of a zero-sized file are moved to the bottom of the list, a file name of a file highly relevant to the error is arranged from the top of the list. Accordingly, the administrator is able to grasp a file highly relevant to the error and a less relevant file while distinguishing between the two.

Furthermore, a file type is classified into a log file and a log file candidate, according to the present example embodiment. Accordingly, the administrator is able to grasp a log file and a log file candidate while distinguishing between the two.

Furthermore, as exemplified in FIG. 15, the display means 6 displays a file name while changing a display mode depending on a server attribute and a file type. Accordingly, the administrator is able to readily distinguish between a file highly relevant to the error and a less relevant file. Similarly, the administrator is able to readily distinguish between a log file and a log file candidate.

Second Example Embodiment

A file information collection system according to a second example embodiment not only generates a list but also acquires a file related to a record in the list from a server. However, the file information collection system does not necessarily acquire every file related to each record in the list.

Figure 16:
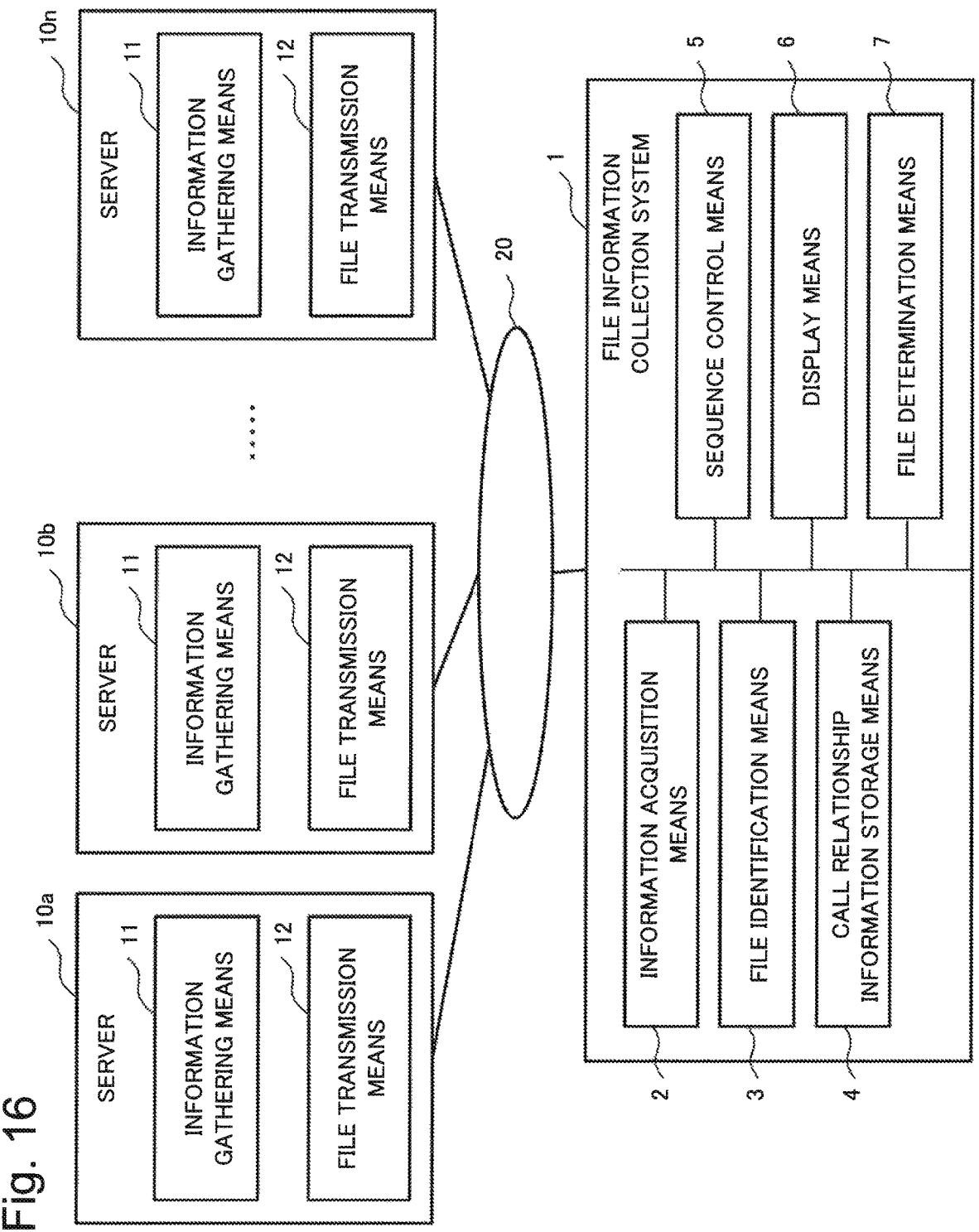
FIG. 16 is a block diagram illustrating a configuration example of a file information collection system according to a second example embodiment of the present invention.

FIG. 16 is a block diagram illustrating a configuration example of the file information collection system according to the second example embodiment of the present invention. Similarly to FIG. 1, FIG. 16 also illustrates servers 10a to 10n. Further, a reference sign identical to that in FIG. 1 is given to a component identical to that in the file information collection system according to the first example embodiment, and description thereof is omitted.

Each of the servers 10a to 10n includes an information gathering means 11 and a file transmission means 12. The information gathering means 11 is similar to the information gathering means 11 according to the first example embodiment, and description thereof is omitted.

The file transmission means 12 transmits a file requested by the file information collection system 1 to the file information collection system 1.

The file information collection system 1 according to the second example embodiment includes a file determination means 7 in addition to the respective means included in the file information collection system 1 according to the first example embodiment.

A sequence control means 5 executes the following processing in addition to the processing described in the first example embodiment. When determining that every record in the list is selected in Step S14 (referring to FIG. 7) (Yes in Step S14), the sequence control means 5 selects a record again from the list obtained at that point. At this time, the sequence control means 5 successively selects a set of consecutive unselected records with a common server name from the top of the list, for each server name. Further, as an example, a case that a record in which a server attribute is "origin" or "callee" is a selection target will be described, according to the present example embodiment. Records in each of which a server attribute is "origin" or "callee" are consecutively arranged from the top of the list.

Then, by requesting each file related to each selected record to a server outputting the each file, the sequence control means 5 acquires the each file. At this time, the file transmission means 12 may transmit a file requested by the sequence control means 5 to the sequence control means 5.

The file determination means 7 determines whether or not information indicating occurrence of an error (hereinafter referred to as error information) is included, for each file acquired from a server by the sequence control means 5. The file determination means 7 changes a "file type" in a record related to a file not including error information to "log file_NOERROR." The notation "log file_NOERROR" indicates that the file does not include error information.

Further, when a "file type" is "log file_NOERROR" in every record belonging to a selected set of records, the sequence control means 5 moves a set of records related to files output from a server on a callee side of a server outputting respective files related to the records to the bottom of the list. Further, the sequence control means 5 changes a "file type" in records belonging to the set to "log file_NOERROR."

For example, an information acquisition means 2, a file identification means 3, a sequence control means 5, a display means 6, and a file determination means 7 are provided by a CPU in a computer including a display device. In this case, the CPU may read a file information collection program from a program recording medium such as a program storage device (unillustrated) in the computer. Then, the CPU may operate as the information acquisition means 2, the file identification means 3, the sequence control means 5, the display means 6, and the file determination means 7, in accordance with the program. Further, the means may be respectively provided by separate pieces of hardware.

Next, processing progression according to the second example embodiment will be described. FIG. 17 is a flowchart illustrating an example of processing progression according to the second example embodiment of the present invention. Operations in Steps S1 to S18 are similar to those according to the first example embodiment, and description thereof is omitted. FIG. 17 illustrates operations after determining that every record in the list is selected in Step S14 (referring to FIG. 7) (Yes in Step S14).

As described above, when determining that every record in the list is selected in Step S14, the sequence control means 5 selects a record again from the list obtained at that point. As an example, a case that a list exemplified in FIG. 18 is obtained when every record in the list is determined to be selected in Step S14 will be described, according to the present example embodiment. A server 4 indicated in FIG. 18 is a server on a callee side of a server 3. Further, while FIG. 18 exemplifies a case that a record in which a server attribute is "reference" does not exist, a record in which a server attribute is "reference" may be included in the list. Note that, as is obvious from the description of the first example embodiment, a set of records in each of which a server attribute is "reference" are consecutively arranged at the bottom of the list.

The sequence control means 5 determines whether or not every record in which a server attribute is "origin" or "callee" is selected from the list (Step S21). The above means that a file related to a record in which a server attribute is "origin" or "callee" is an acquisition target. In the example illustrated in FIG. 18, respective files related to the first to fifth records are acquisition targets. However, as will be described later, there may be a case that the sequence control means 5 does not acquire an acquisition target file from a server.

When an unselected record in which a server attribute is "origin" or "callee" exists (No in Step S21), the sequence control means 5 transitions to Step S22.

In Step S22, the sequence control means 5 selects a set of consecutive records related to files output from a common server (Step S22). The sequence control means 5 may select consecutive unselected records with a common server name. The sequence control means 5 selects a set of unselected records closest to the top of the list. Note that the number of records belonging to the set of records selected in Step S22 may be one. For example, when only one record with a certain server name exists, the sequence control means 5 may select the one record in Step S22.

When transitioning to Step S22 for the first time, the sequence control means 5 selects two consecutive records with a server name "server 2" from the top of the list (referring to FIG. 18).

The sequence control means 5 acquires respective files related to the records selected in Step S22 from a server outputting the respective files (Step S23). In this example, by requesting each file related to each of the first and second records listed in FIG. 18 to the file transmission means 12 in the server 2, the sequence control means 5 acquires the respective files.

When requesting a file to a server in Step S23, the sequence control means 5 may also transmit reference time information to the server and request only a part corresponding to a record at or after the reference time out of a content described in the file. The file transmission means 12 receiving the request may transmit to the sequence control means 5 only the part corresponding to the record at or after the reference time out of the content described in the requested file. A log file records various items in a chronological order, and a record at a time before the reference time may be considered less relevant to an error causing an alert output. Accordingly, by acquiring only the part corresponding to the record at or after the reference time, the sequence control means 5 is able to suppress increase in file size kept by the file information collection system 1.

The sequence control means 5 may acquire the entire requested file from the server in Step S23.

Next, the file determination means 7 determines whether or not error information is included, for each file obtained in Step S23 (Step S24). The file determination means 7 may determine that a file includes error information when a predetermined error level is recorded in the file. Then, the file determination means 7 may determine that the file does not include error information when the predetermined error level is not recorded in the file. Further, file determination means 7 may determine that a file includes error information when a predetermined wording (a wording such as "error" or "fatal") is included in the file. Then, the file determination means 7 may determine that the file does not include error information when the predetermined wording is not included in the file.

Further, in Step S24, the file determination means 7 changes a "file type" in a record related to a file determined not to include error information to "log file_NOERROR."

Next, the sequence control means 5 determines whether or not a "file type" in every record belonging to the set of records selected in Step S22 is "log file_NOERROR" (Step S25). A "file type" in every record belonging to the selected set of records being "log file_NOERROR" means that no file acquired in Step S22 includes error information.

When a record in which a "file type" is not "log file_NOERROR" exists out of all records belonging to the selected set of records (No in Step S25), the sequence control means 5 transitions to Step S21 and performs the operations in and after Step S21.

When a "file type" in every record belonging to the selected set of records is "log file_NOERROR" (Yes in Step S25), the sequence control means 5 transitions to Step S26.

This example will be described on the assumption that each file related to each of the first and second records listed in FIG. 18 includes error information. In this case, the sequence control means 5 transitions from Step S25 to Step S21 without changing a "file type" in each of the first and second records.

In this case, an unselected record in which a server attribute is "origin" or "callee" (the third to fifth records listed in FIG. 18) exists (No in Step S21). Accordingly, the sequence control means 5 selects two consecutive records in each of which a server name is "server 3" (the third and fourth records listed in FIG. 18) (Step S22).

Next, by requesting files related to the two records to the server 3, the sequence control means 5 acquires the two files from the server 3 (Step S23).

The following description assumes that neither of the two files related to the third and fourth records listed in FIG. 18 includes error information. In this case, the file determination means 7 determines that each of the two files does not include error information and changes a "file type" in each of the records selected in Step S22 to "log file_NOERROR" (Step S24).

Then, the sequence control means 5 determines that a "file type" in every record belonging to the set of records selected in Step S22 is "log file_NOERROR" (Yes in Step S25) and transitions to Step S26.

In Step S26, the sequence control means 5 moves a set of records subsequent to the set of records (the third and fourth records listed in FIG. 18) selected in the latest Step S22, a server attribute in each of the records being "callee," to the bottom of the list. Additionally, the sequence control means 5 changes a "file type" in each record belonging to the set to "log file_NOERROR" (Step S26).

In this example, a set of records subsequent to the third and fourth records listed in FIG. 18, a server attribute in each of the records being "callee" is a set including only the fifth record listed in FIG. 18. Accordingly, the sequence control means 5 moves the fifth record listed in FIG. 18 to the bottom of the list and changes a "file type" in each of the two records to "log file_NOERROR." FIG. 19 is a schematic diagram illustrating a state of the list at this point.

After Step S26, the sequence control means 5 transitions to Step S27. The above means that the sequence control means 5 does not transition to Steps S21 and S22, and discontinues selection of a set of records.

In Step S27, the display means 6 displays each file name included in the list for each server (Step S27). At this time, the display means 6 changes a display mode of a file name depending on a server attribute and a file type.

Figure 20:
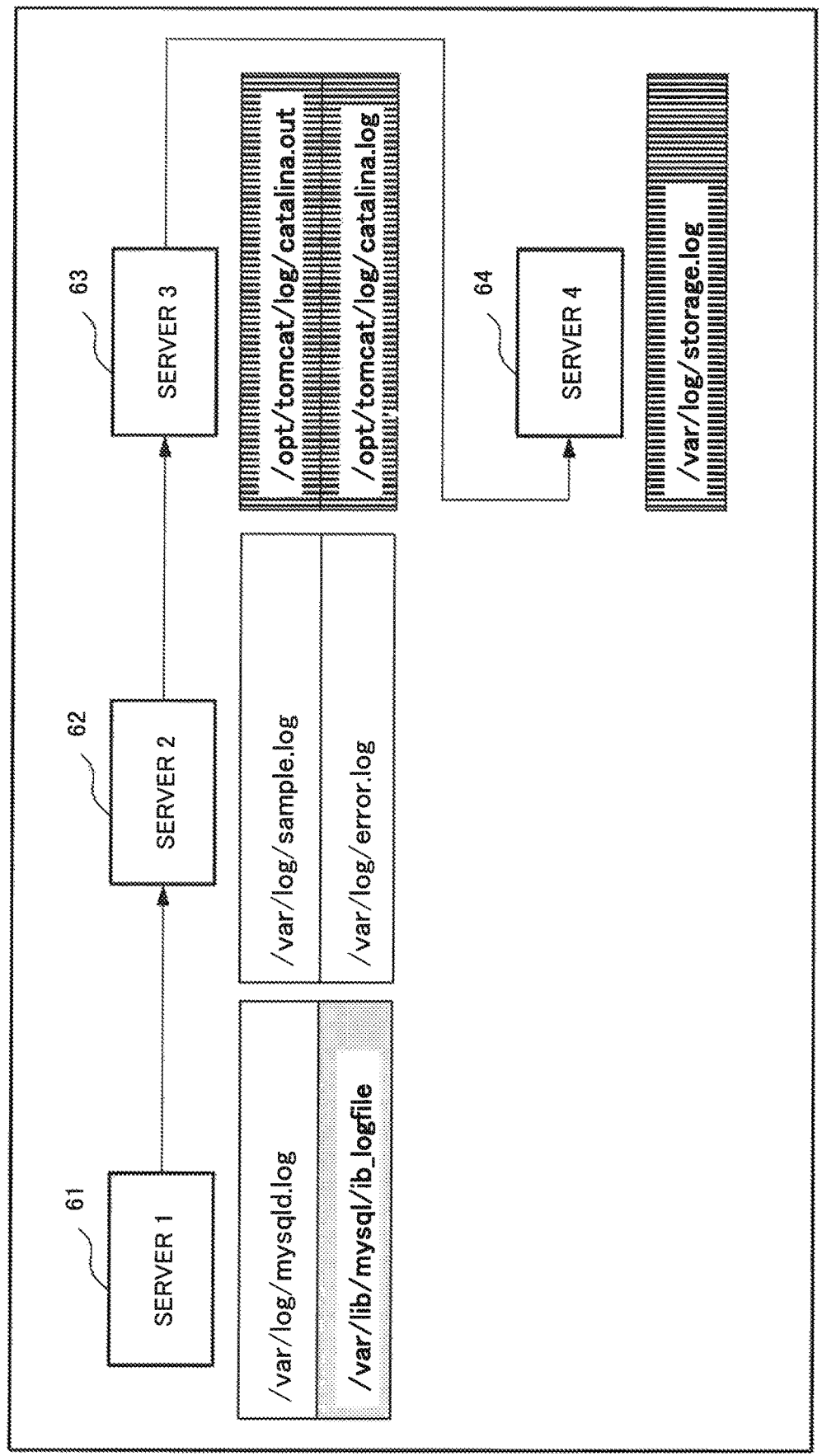
FIG. 20 is a diagram illustrating an example of a screen displayed by a display means.

FIG. 20 is a diagram illustrating an example of a screen displayed by the display means 6. For example, the display means 6 displays icons 61 to 64 representing respective servers. Then, the display means 6 displays a file name of a file output by a server close to an icon thereof. The above is similar to Step S19 according to the first example embodiment.

Furthermore, the display means 6 sets a background of a file name in a record in which a file type is "log file_NOERROR" to a background different from a background of another file name (referring to FIGS. 19 and 20). Similarly, the display means 6 sets a background of a file name in a record in which a file type is "log file candidate" to a background different from a background of another file name (referring to FIGS. 19 and 20).

Further, the examples illustrated in FIGS. 18 and 19 illustrate a case that a record in which a server attribute is "reference" does not exist. On the other hand, when a record in which a server attribute is "reference" exists, the display means 6 sets a background of a file name in the record to a background different from a background of another file name.

Further, the display means 6 may change a display mode between a file name of a file acquired from a server and a file name of a file not acquired from a server.

The processing is ended in Step S27.

In the aforementioned example, the file information collection system 1 ends the processing without acquiring a file "/var/log/storage.log" output by the server 4. As already described, when an error occurs in any server, the error extends to a server being a caller viewed from the server. Accordingly, when none of the files output by the server 3 includes error information, a file output by the server 4 on a callee side viewed from the server 3 is also considered not to include error information. Additionally, a file not including error information is considered not to contribute so much to failure analysis such as location of an error source, even when the file is acquired. Accordingly, by not acquiring a file output by the server 4, the number of kept files considered not to contribute so much to failure analysis can be held down.

The description above describes a case that the two files respectively related to the third and fourth records listed in FIG. 18 do not include error information.

When at least one of the two files respectively related to the third and fourth records listed in FIG. 18 includes error information, the sequence control means 5 transitions from Step S25 to Step S21 and performs the operations in and after Step 21. In this case, the sequence control means 5 transitions from Step S21 to Step S22 and selects the fifth record listed in FIG. 18. Subsequently, the sequence control means 5 transitions to Steps S23, S24, and S25. Let us assume that the sequence control means 5 determines that a "file type" in the fifth record listed in FIG. 18 is not "log file_NOERROR" in Step S25 (No in Step S25). In other words, let us assume that a file related to the record includes error information. In this case, the sequence control means 5 transitions to Step S21 again. At this time, the sequence control means 5 determines that every record in which a server attribute is "origin" or "callee" is selected from the list (Yes in Step S21). In this case, the display means 6 executes the display processing in Step S27. The display processing in Step S27 has been already described, and therefore description thereof is omitted. Thus, the example illustrated in FIG. 17 includes a case of transitioning from Step S26 to Step S27 and ending the processing, and a case of transitioning from Step S21 to Step S27 and ending the processing.

The second example embodiment provides an effect similar to that provided by the first example embodiment. Additionally, the second example embodiment is able to concentrate files used for failure analysis from each server to the file information collection system 1. As described above, when an error occurs in any server, the error extends to a server being a caller viewed from the server. Accordingly, files output by the origin server and each server on a callee side are considered significant in failure analysis such as location of an error source. The file information collection system 1 according to the present example embodiment is able to acquire files output by the origin server and each server on a callee side.

Further, when each file output by a server does not include error information, a file output by each server on a callee side of the server may also be considered not to include error information. The file information collection system 1 according to the present example embodiment does not acquire a file output by each of such servers on a callee side. Accordingly, the number of kept files considered not to contribute so much to failure analysis can be held down.

In the flowchart illustrated in FIG. 17, after Step S22, the file information collection system 1 may execute the processing in Steps S23 and S24 for each record belonging to the set of records selected in Step S22. For example, the file information collection system 1 may execute the processing in Steps S23 and S24 on a record belonging to the set of records selected in Step S22 and subsequently execute the processing in Steps S23 and S24 on a next record. Then, the file information collection system 1 may transition to Step S25 after completing the processing in Steps S23 and S24 on every record belonging to the selected set of records.

Next, a modified example of the second example embodiment will be described.

The case according to the aforementioned second example embodiment that, in Step S21, the sequence control means 5 determines whether or not every record in which a server attribute is "origin" or "callee" is selected from the list has been described.

In Step S21, the sequence control means 5 may determine whether or not every record in which a server attribute is "origin," "callee," or "caller" is selected from the list. The above means that a file related to a record in which a server attribute is any one of "origin," "callee," and "caller" is an acquisition target. In this case, the sequence control means 5 may transition to Step S21 after Step S26. However, the sequence control means 5 performs the determination in Step S21 assuming that the set of records moved to the bottom of the list in Step S26 are already selected.

Further, when the sequence control means 5 selects a set of files in each of which a server attribute is "caller" in Step S22, the sequence control means 5 does not perform the determination processing in Step S25 and transitions to Step S21 after Step S24.

In this case, the file information collection system 1 is also able to acquire a log file output by a server on a caller side viewed from the origin server.

Further, the file information collection system 1 may collect each file related to every record included in the list.

Third Example Embodiment

A file information collection system according to a third example embodiment generates call relationship information, based on communication record information of a server and stores the call relationship information.

Figure 21:
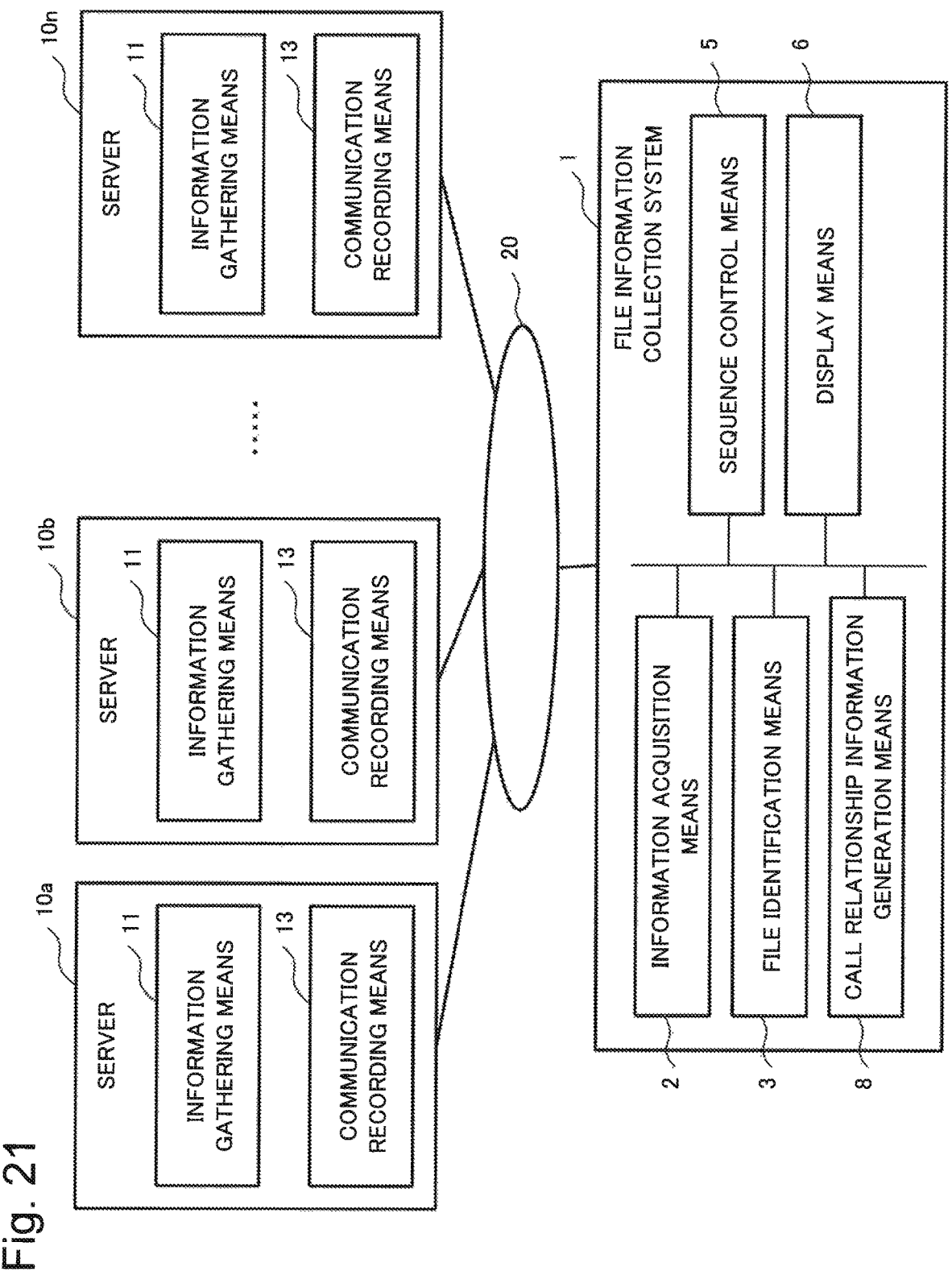
FIG. 21 is a block diagram illustrating a configuration example of a file information collection system according to a third example embodiment of the present invention.

FIG. 21 is a block diagram illustrating a configuration example of the file information collection system according to the third example embodiment of the present invention. Similarly to FIG. 1, FIG. 21 also illustrates servers 10*a* to 10*n*. Further, a reference sign identical to that in FIG. 1 is given to a component identical to that in the file information collection system according to the first example embodiment, and description thereof is omitted.

Each of the servers 10*a* to 10*n* includes an information gathering means 11 and a communication recording means 13. The information gathering means 11 is similar to the information gathering means 11 according to the first example embodiment, and description thereof is omitted.

The communication recording means 13 generates and keeps communication record information about communication with another server. The communication record information includes a combination of a process ID, a local port number, a destination, and a destination port. FIG. 22 is a diagram illustrating an example of communication record information generated by each of the servers 1 to 3.

The process ID is an ID of a process operating on a server including the communication recording means 13. For example, a process ID described in communication record information generated by the communication recording means 13 in a server 1 is a process ID of a process operating on the server 1.

The local port number is a port number of a port on a server including the communication recording means 13. For example, a local port number described in the communication record information generated by the communication recording means 13 in the server 1 is a port number of the server 1.

The destination is a server name of a server communicating with a server including the communication recording means 13. For example, a destination described in the communication record information generated by the communication recording means 13 in the server 1 is a server name of a server communicating with the server 1.

The destination port is a port number of a server communicating with a server including the communication recording means 13. More specifically, the destination port is a port number of a port used in communication by a server being a communication counterpart of the server including the communication recording means 13.

Describing the last row of communication record information 71 of the server 1 illustrated in FIG. 22 as an example, the last row indicates the following items. A process "101" on the server 1 communicates with a server 2, and at that time, the process "101" uses a port "33894" on the server 1, and the server 2 uses a port "8080" on the server 2.

When a communication with another server is newly initiated, the communication recording means 13 newly adds a set of a process ID, a local port number, a destination, and a destination port to communication record information.

Further, the communication recording means 13 also includes in the communication record information a pair of a process ID and a port number of a listening port out of ports on a server including the communication recording means 13. The listening port is a port in a state capable of accepting a communication from another server.

A port number of a listening port is described in communication record information as a local port number for which information about a related destination and destination port is not identified. For example, in the communication record information 71 of the server 1, "80" is described as a local port number for which information about a related destination and destination port is not identified. Accordingly, in the server 1, a listening port is a port "80."

The communication recording means 13 describes in communication record information a port number of a listening port as a local port number for which information about a related destination and destination port is not identified.

A server uses a listening port when called by another server. For example, let us assume that a server A communicates with another server B through a listening port. In this case, the server B becomes a caller and calls the server A, and the servers A and B communicate with one another. In this case, the server A is a callee server viewed from the server B.

Further, a server uses a port other than a listening port when calling another server. For example, let us assume that a server A communicates with a server B through a port other than a listening port. In this case, the server A becomes a caller and calls the server B, and the servers A and B communicate with one another. In this case, the server A is a caller server viewed from the server B.

In response to a request from a file information collection system 1, the communication recording means 13 transmits kept communication record information to the file information collection system 1.

As an example, a case that the file information collection system 1 according to the third example embodiment includes a call relationship information generation means 8 (referring to FIG. 21) in place of the call relationship information storage means 4 (referring to FIG. 1) in the file information collection system 1 according to the first example embodiment will be described below.

The file information collection system 1 according to the third example embodiment may be configured to include the call relationship information generation means 8 in place of the call relationship information storage means 4 (referring to FIG. 16) in the file information collection system 1 according to the second example embodiment. In other words, the third example embodiment may be applied to the second example embodiment.

The call relationship information generation means 8 successively acquires communication record information from each server. Then, the call relationship information generation means 8 identifies a call relationship between processes operating on each server, based on the communication record information of each server, and generates call relationship information. The call relationship information generation means 8 stores the generated call relationship information.

The call relationship information storage means 4 (referring to FIGS. 1 and 16) according to the first and second example embodiments is configured to store call relationship information previously prepared by an administrator or the like. On the other hand, the call relationship information generation means 8 according to the present example embodiment generates and stores call relationship information.

As an example, a case that the call relationship information generation means 8 generates and stores call relationship information when origin information is input and subsequently transitions to Step S1 (referring to FIG. 5) will be described below. The timing of the call relationship information generation means 8 generating call relationship information is not limited to this example, and for example, the call relationship information generation means 8 may periodically generate call relationship information.

For example, an information acquisition means 2, a file identification means 3, a sequence control means 5, a display means 6, and the call relationship information generation means 8 are provided by a CPU in a computer including a display device. In this case, the CPU may read a file information collection program from a program recording medium such as a program storage device (unillustrated) in the computer. Then, the CPU may operate as the information acquisition means 2, the file identification means 3, the sequence control means 5, the display means 6, and the call relationship information generation means 8, in accordance with the program. Further, the means may be respectively provided by separate pieces of hardware.

Figure 23:
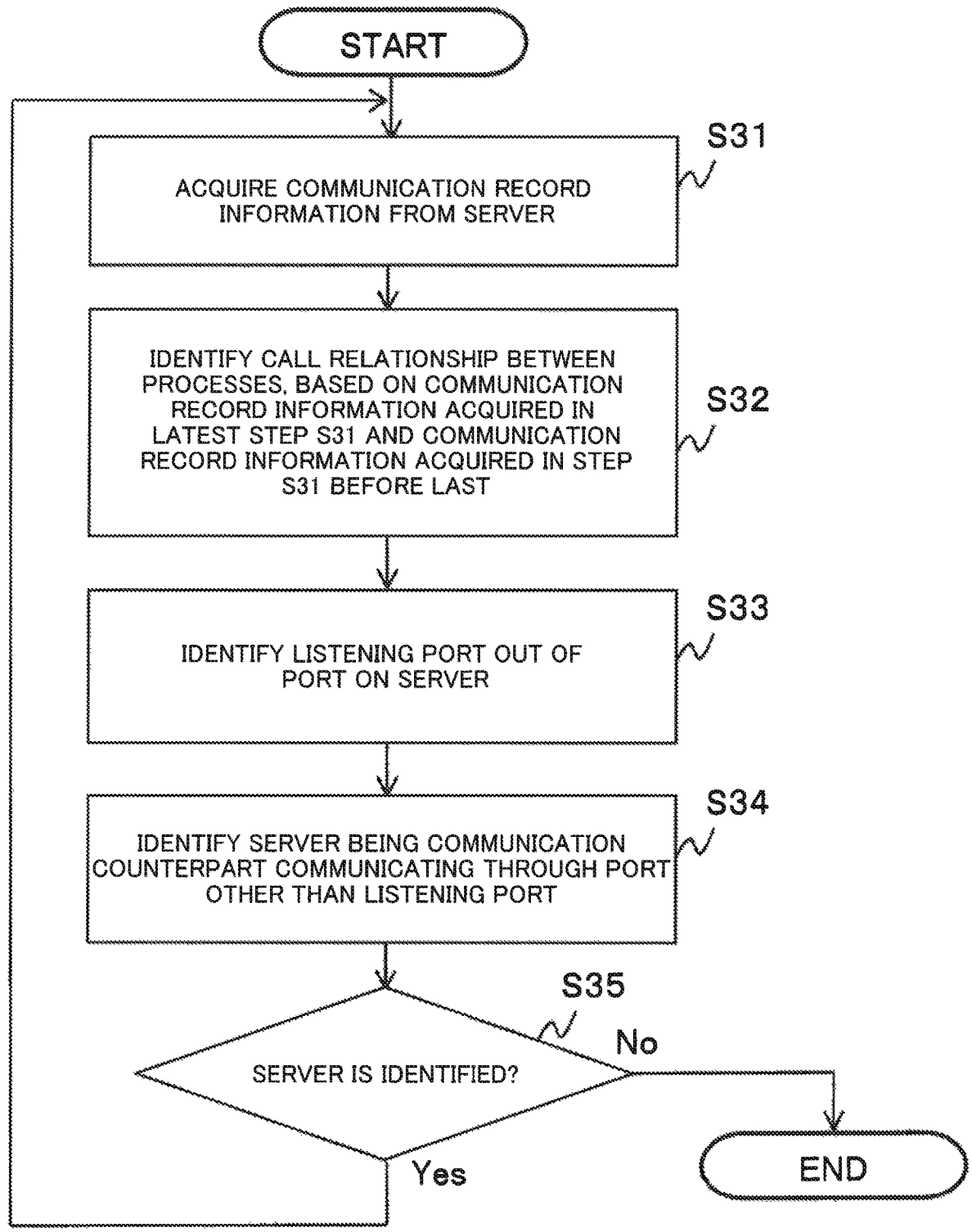
FIG. 23 is a flowchart illustrating an example of processing of identifying a call relationship between processes on a callee side viewed from an origin server.

Processing progression of the call relationship information generation means 8 will be described below. FIG. 23 is a flowchart illustrating an example of processing of identifying a call relationship between processes on a callee side viewed from an origin server.

When origin information is input, the call relationship information generation means 8 acquires communication record information from a server (Step S31). When transitioning to Step S31 for the first time after input of the origin information, the call relationship information generation means 8 acquires communication record information from a server related to a server name included in the origin information. Further, Steps S31 to S35 form loop processing, and a transition from Step S35 to Step S31 may occur. In this case, the call relationship information generation means 8 acquires communication record information from a server identified in the latest Step S34.

The call relationship information generation means 8 may acquire communication record information by requesting communication record information to the communication recording means 13 included in the server. In response to the request, the communication recording means 13 may transmit kept communication record information to the call relationship information generation means 8.

Let us assume that a server name "server 2" is included in the origin information. In this case, when transitioning to Step S31 for the first time, the call relationship information generation means 8 acquires communication record information from the server 2. In this case, it is assumed that communication record information 72 exemplified in FIG. 22 is acquired.

After Step S31, the call relationship information generation means 8 identifies a call relationship between processes, based on the communication record information acquired in the latest Step S31 and communication record information acquired in the Step S31 before last (Step S32). "The Step S31 before last" refers to Step S31 a round before the latest Step S31.

However, when transitioning to Step S32 for the first time, the latest Step S31 is the first Step S31, and the call relationship information generation means 8 has not previously acquired communication record information. In this case, the call relationship information generation means 8 may transition to Step S33 without identifying a call relationship between processes in Step S32. In this case, the call relationship information generation means 8 acquires only the communication record information 72 in the first Step S31 and therefore transitions to Step S33.

In Step S33, the call relationship information generation means 8 refers to the communication record information acquired in the latest Step S31. Then, the call relationship information generation means 8 identifies a listening port out of ports on the server (the server providing the communication record information in Step S31). In the communication record information 72 (referring to FIG. 22), a local port number for which information about a related destination and destination port is not identified is "8080." Accordingly, the call relationship information generation means 8 identifies a port "8080" as a listening port on the server 2.

Next, the call relationship information generation means 8 refers to the communication record information acquired in the latest Step S31. Then, the call relationship information generation means 8 identifies a server being a communication counterpart communicating through a port other than the listening port (Step S34). In the communication record information 72, "48940" is described as a port number of a port other than the listening port on the server 2. Accordingly, the call relationship information generation means 8 identifies a server 3 (referring to FIG. 22) related to a local port number "48940."

When a port number of a port other than a listening port is not described as a local port number, the call relationship information generation means 8 is not able to identify a server in Step S34.

Further, each server (the server 1, the server 2, and the server 3 in the example illustrated in FIG. 22) belonging to a system in operation may call a server not belonging to the system (e.g. a domain name system [DNS] server). When a server name of a server not belonging to the system is associated with a port number of a port other than a listening port, the call relationship information generation means 8 determines that a server cannot be identified. For example, the call relationship information generation means 8 may prestore a server name of each server belonging to a system in operation. Then, by comparing the server name with a server name obtained from communication history information, the call relationship information generation means 8 may determine whether or not a server with the obtained server name belongs to the system.

When a server is identified in Step S34 (Yes in Step S35), the call relationship information generation means 8 transitions to Step S31.

In next Step S31, the call relationship information generation means 8 acquires communication record information from the server 3 identified in the latest Step S34. In this case, it is assumed that the call relationship information generation means 8 acquires communication record information 73 exemplified in FIG. 22 from the server 3.

Next, the call relationship information generation means 8 identifies a call relationship between processes, based on the communication record information acquired in the latest Step S31 and the communication record information acquired in the Step S31 before last (Step S32).

In this case, the communication record information acquired in the latest Step S31 is the communication record information 73, and the communication record information acquired in the Step S31 before last is the communication record information 72. Further, in description of Step S32, the communication record information acquired in the Step S31 before last is referred to as first communication record information. Further, the communication record information acquired in the latest Step S31 is referred to as second communication record information.

The call relationship information generation means 8 identifies a port number other than a listening port, based on the first communication record information (the communication record information 72). Further, the call relationship information generation means 8 identifies a process ID and a destination port that are related to the port number. In description of Step S32, a process with the process ID is referred to as a first process. Further, the call relationship information generation means 8 identifies a server providing the first communication record information as a server on which the first process operates. In this example, based on the communication record information 72, the call relationship information generation means 8 identifies a port number "48940" other than the listening port and identifies a process ID "201" related to the port number. Further, the call relationship information generation means 8 identifies the "server 2" as a server on which the first process operates. Further, in this example, the call relationship information generation means 8 identifies a destination port "3306" related to "48940."

Furthermore, based on the second communication record information (the communication record information 73), the call relationship information generation means 8 identifies a process ID related to a local port number identical to the destination port identified from the first communication record information. In description of Step S32, a process with the process ID is referred to as a second process. Further, the call relationship information generation means 8 identifies a server providing the second communication record information as a server on which the second process operates. In this example, the call relationship information generation means 8 refers to the communication record information 73. Then, the call relationship information generation means 8 identifies a process ID "301" related to a local port number identical to the destination port "3306" identified from the first communication record information (referring to FIG. 22). Further, the call relationship information generation means 8 identifies the "server 3" as a server on which the second process operates.

Figure 24:
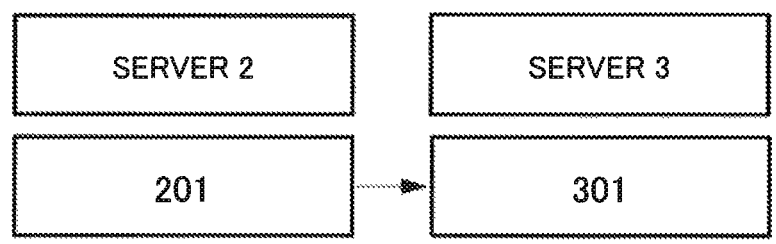
FIG. 24 is a schematic diagram illustrating an example of call relationship information generated in Step S32.

The call relationship information generation means 8 generates call relationship information indicating a relationship that the first process calls the second process, a server on which the first process operates, and the second process. FIG. 24 is a schematic diagram illustrating an example of call relationship information generated in Step S32. When call relationship information generated in or before the latest Step S32 exists, the call relationship information generation means 8 adds newly generated call relationship information to the call relationship information.

After Step S32, the call relationship information generation means 8 refers to the communication record information acquired in the latest Step S31. Then, the call relationship information generation means 8 identifies a listening port out of ports on the server (the server providing the communication record information in Step S31) (Step S33). In this case, based on the communication record information 73, the call relationship information generation means 8 identifies the port "3306" as a listening port.

Next, the call relationship information generation means 8 refers to the communication record information acquired in the latest Step S31. Then, the call relationship information generation means 8 identifies a server being a communication counterpart communicating through a port other than the listening port (Step S34). In this example, a port number other than the port number "3306" of the listening port is not described as a local port number in the communication record information 73. Accordingly, the call relationship information generation means 8 is not able to identify a server in Step S34.

In this case (No in Step S35), the processing of identifying a call relationship between processes on a callee side viewed from the origin server is ended. Consequently, the call relationship information schematically illustrated in FIG. 24 is obtained.

When a server is identified in the aforementioned Step S34, a process on another server called by the process on the server 3 exists. In this case (Yes in Step S35), the call relationship information generation means 8 may further perform the processing in and after Step S31.

Figure 25:
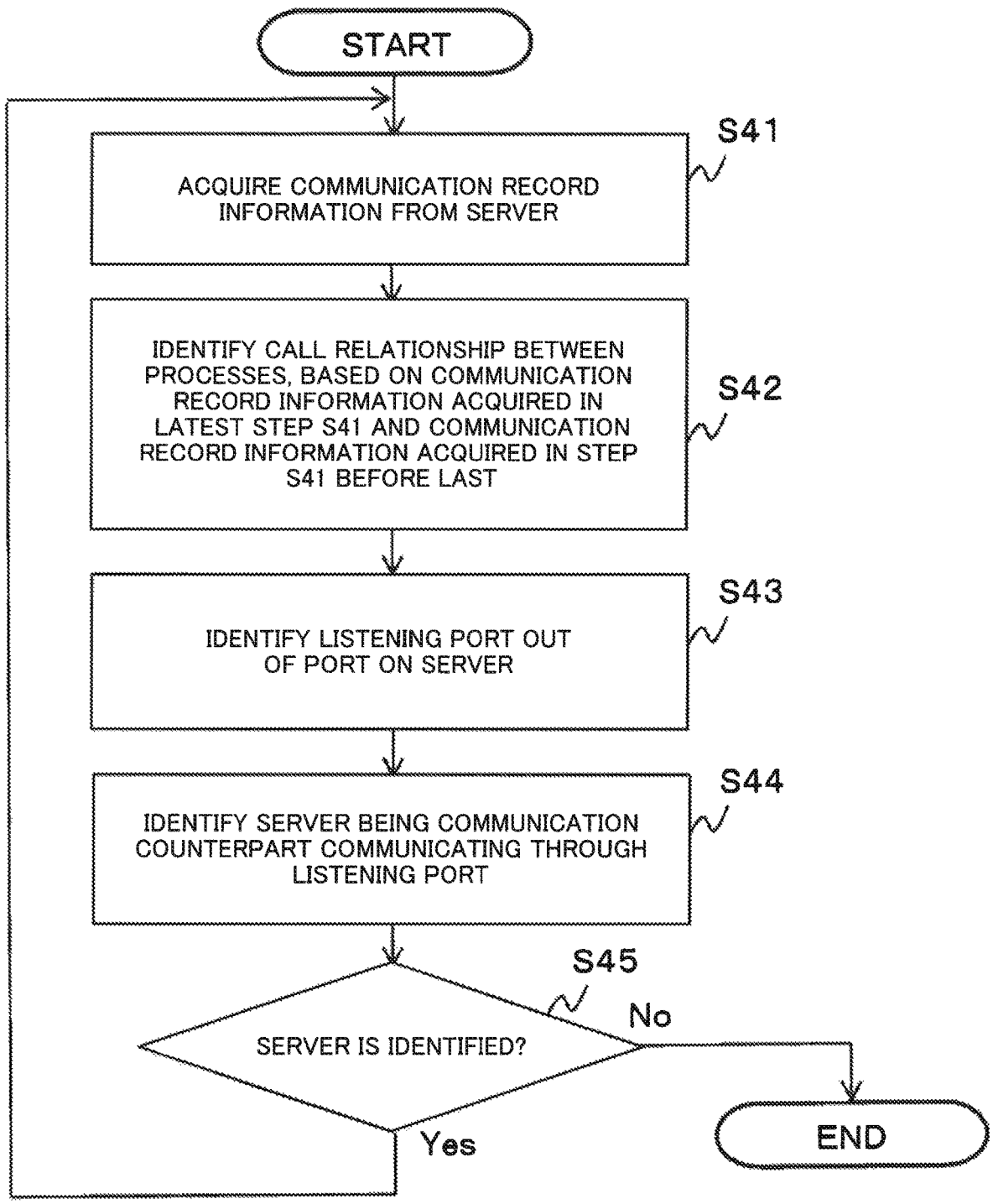
FIG. 25 is a flowchart illustrating an example of processing of identifying a call relationship between processes on a caller side viewed from an origin server.

Next, processing of identifying a call relationship between processes on a caller side viewed from an origin server will be described. FIG. 25 is a flowchart illustrating an example of the processing of identifying a call relationship between processes on a caller side viewed from an origin server. The call relationship information generation means 8 may perform processing described below after completion of the processing illustrated in FIG. 23.

The call relationship information generation means 8 acquires communication record information from a server (Step S41). When transitioning to Step S41 for the first time after input of origin information, the call relationship information generation means 8 acquires communication record information from a server related to a server name included in the origin information. However, when transitioning to Step S31 (referring to FIG. 23) for the first time, the call relationship information generation means 8 has acquired communication record information from the server related to the server name included in the origin information. Accordingly, when transitioning to Step S41 for the first time, the call relationship information generation means 8 may assume the communication record information as communication record information acquired in the first Step S41. In this case, the call relationship information generation means 8 assumes the communication record information 72 as communication record information acquired from the server 2 in the first Step S41.

Further, Steps S41 to S45 form loop processing, and a transition from Step S45 to Step S41 may occur. In this case, the call relationship information generation means 8 acquires communication record information from a server identified in the latest Step S44.

Similarly to Step S31, the call relationship information generation means 8 may acquire communication record information by requesting communication record information to the communication recording means 13 included in the server. In response to the request, the communication recording means 13 may transmit kept communication record information to the call relationship information generation means 8.

After Step S41, the call relationship information generation means 8 identifies a call relationship between processes, based on the communication record information acquired in the latest Step S41 and communication record information acquired in the Step S41 before last (Step S42). "The Step S41 before last" refers to Step S41 a round before the latest Step S41.

However, when transitioning to Step S42 for the first time, the latest Step S41 is the first Step S41, and the call relationship information generation means 8 has not previously acquired communication record information. In this case, the call relationship information generation means 8 may transition to Step S43 without identifying a call relationship between processes in Step S42. In this case, the call relationship information generation means 8 only acquires the communication record information 72 in the first Step S41 and therefore transitions to Step S43.

In Step S43, the call relationship information generation means 8 refers to the communication information acquired in the latest Step S41. Then, the call relationship information generation means 8 identifies a listening port out of ports on the server (the server providing the communication record information in Step S41) (Step S43). Step S43 represents processing similar to that in the aforementioned Step S33. In this case, based on the communication record information 72, the call relationship information generation means 8 identifies that a listening port on the server 2 is the port "8080."

Next, the call relationship information generation means 8 refers to the communication record information acquired in the latest Step S41 and identifies a server being a communication counterpart communicating through the listening port (Step S44). In this case, based on the communication record information 72, the call relationship information generation means 8 identifies the server 1 related to the port number "8080" of the listening port (referring to FIG. 22).

When a destination and destination port information that are related to the port number "8080" of the listening port are not described (e.g. when the last row in the communication record information 72 exemplified in FIG. 22 does not exist), the call relationship information generation means 8 is not able to identify a server in Step S44.

Further, when a server related to the port number of the listening port is a server (e.g. a DNS server) not belonging to the system in operation, the call relationship information generation means 8 determines that a server cannot be identified. For example, the call relationship information generation means 8 may prestore a server name of each server belonging to the system in operation. Then, by comparing the server name with a server name obtained from communication record information, the call relationship information generation means 8 may determine whether or not a server with the obtained server name belongs to the system.

When a server is identified in Step S44 (Yes in Step S45), the call relationship information generation means 8 transitions to Step S41.

In next Step S41, the call relationship information generation means 8 acquires communication record information from the server 1 identified in the latest Step S44. In this case, it is assumed that the call relationship information generation means 8 acquires the communication record information 71 exemplified in FIG. 22 from the server 1.

Next, the call relationship information generation means 8 identifies a call relationship between processes, based on the communication record information acquired in the latest Step S41 and the communication record information acquired in the Step S41 before last (Step S42).

In this case, the communication record information acquired in the latest Step S41 is the communication record information 71, and the communication record information acquired in the Step S41 before last is the communication record information 72. Further, in description of Step S42, the communication record information acquired in the Step S41 before last is referred to as first communication record information. Further, the communication record information acquired in the latest Step S41 is referred to as second communication record information.

The call relationship information generation means 8 identifies a port number of a listening port, based on the first communication record information (the communication record information 72). Further, the call relationship information generation means 8 identifies a process ID and a destination port that are related to the port number. In description of Step S42, a process with the process ID is referred to as a first process. Further, the call relationship information generation means 8 identifies a server providing the first communication record information as a server on which the first process operates. In this example, based on the communication record information 72, the call relationship information generation means 8 identifies the port number "8080" of the listening port and identifies the process ID "201" related to the port number. Further, the call relationship information generation means 8 identifies the "server 2" as the server on which the first process operates. Further, in this example, the call relationship information generation means 8 identifies a destination port "33894" related to "8080."

Furthermore, based on the second communication record information (the communication record information 71), the call relationship information generation means 8 identifies a process ID related to a local port number identical to the destination port identified from the first communication record information. In description of Step S42, a process with the process ID is referred to as a second process. Further, the call relationship information generation means 8 identifies a server providing the second communication record information as a server on which the second process operates. In this example, the call relationship information generation means 8 refers to the communication record information 71. Then, the call relationship information generation means 8 identifies the process ID "101" related to a local port number identical to the destination port "33894" identified from the first communication record information (referring to FIG. 22). Further, the call relationship information generation means 8 identifies the "server 1" as a server on which the second process operates.

Figure 26:
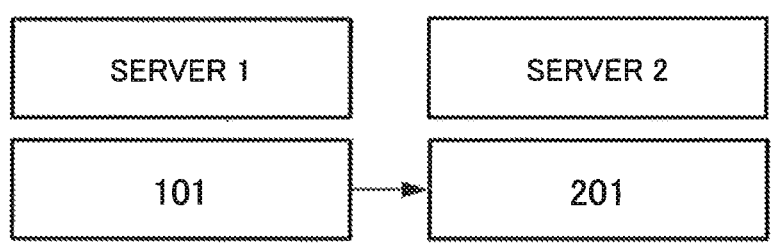
FIG. 26 is a schematic diagram illustrating an example of call relationship information generated in Step S42.

The call relationship information generation means 8 generates call relationship information indicating a relationship that the second process calls the first process, a server on which the first process operates, and the second process. FIG. 26 is a schematic diagram illustrating an example of call relationship information generated in Step S42. When call relationship information generated in or before the latest Step S42 exists, the call relationship information generation means 8 adds the newly generated call relationship information to the call relationship information.

After Step S42, the call relationship information generation means 8 refers to the communication record information acquired in the latest Step S41. Then, the call relationship information generation means 8 identifies a listening port out of ports on the server (the server providing the communication record information in Step S41) (Step S43). In this case, based on the communication record information 71, the call relationship information generation means 8 identifies that the listening port is the port "80."

Next, the call relationship information generation means 8 refers to the communication record information acquired in the latest Step S41 and identifies a server being a communication counterpart communicating through the listening port (Step S44). In this example, a destination and destination port information that are related to the port number "80" of the listening port is not described in the communication record information 71. Accordingly, the call relationship information generation means 8 is not able to identify a server in Step S44.

In this case (No in Step S45), the processing of identifying a call relationship between processes on a caller side viewed from the origin server is ended. Consequently, call relationship information schematically illustrated in FIG. 26 is obtained.

When a server is identified in the aforementioned Step S44, a process on the server 1 is called by a process on another server. In this case (Yes in Step S45), the call relationship information generation means 8 may further perform the processing in and after Step S41.

Figure 27:
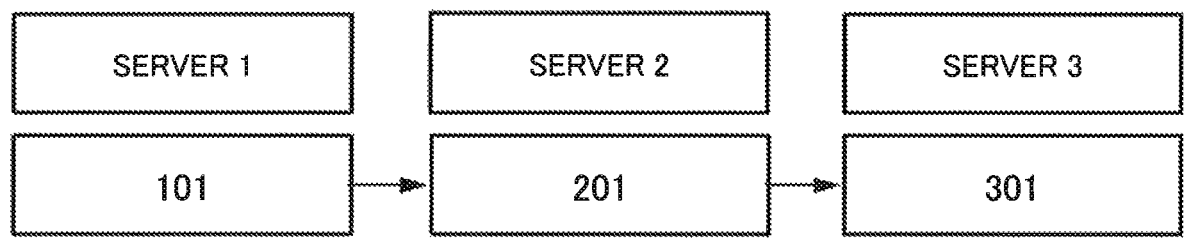
FIG. 27 is a schematic diagram illustrating an example of generated call relationship information.

After the processing of identifying a call relationship between processes on a caller side viewed from the origin server (referring to FIG. 23) and the processing of identifying a call relationship between processes on a caller side viewed from the origin server (referring to FIG. 25) are ended, the call relationship information generation means 8 merges pieces of call relationship information obtained by the two types of processing. Consequently, call relationship information schematically illustrated in FIG. 27 is obtained. The call relationship information generation means 8 stores the resulting call relationship information.

Subsequently, the file information collection system 1 may execute the processing in and after Step S1.

The file information collection system 1 according to the present example embodiment generates call relationship information, and therefore an administrator does not need to preset the call relationship information. Accordingly, a burden on the administrator can be lightened.

Figure 28:
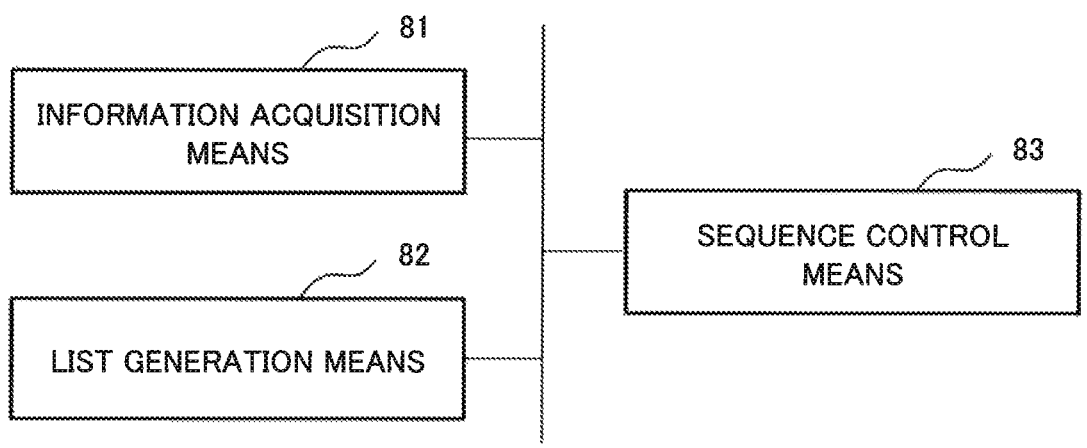
FIG. 28 is a block diagram illustrating an overview of a file information collection system according to the present invention.

Next, an overview of a file information collection system according to the present invention will be described. FIG. 28 is a block diagram illustrating an overview of the file information collection system according to the present invention. The file information collection system according to the present invention includes an information acquisition means 81, a list generation means 82, and a sequence control means 83.

When a process is identified, the information acquisition means 81 (e.g. the information acquisition means 2) acquires a process ID of each process represented in a tree structure indicating a parent-child relationship between processes including the identified process, and a file name and a file attribute of each file opened by each process, from a server on which the identified process operates.

The list generation means 82 (e.g. the file identification means 3) selects a file a file name of which meets a predetermined condition, a file attribute of the file being writable or readable/writable. Then, with the selected file as a target, the list generation means 82 generates a list of a record including identification information of a server outputting the file, the file name, and a server attribute of the server outputting the file.

The information acquisition means 81 newly identifies a process called by an identified process, and subsequently to a process called by an identified process no longer existing, newly identifies a process being a caller of an initially identified process. Then, the information acquisition means 81 successively identifies a new process being a caller of an identified process.

When generating a list by a process being newly identified, the list generation means 82 adds the list at the bottom of an already-generated list.

The sequence control means 83 (the sequence control means 5) selects a record from the top of a list one by one in a sequential order and acquires information about an update time of a file related to a selected record, from a server outputting the file. When the update time is a time before a reference time specified by a user, the sequence control means 83 changes a server attribute in a selected record to a predetermined information and moves the record to the bottom of the list.

The server attribute is an attribute indicating a server on which an initially identified process operates, a callee server viewed from the server on which the initially identified process operates, a caller server viewed from the server on which the initially identified process operates, or the aforementioned predetermined information.

Such a configuration enables determination of an appropriate log file for failure analysis and generation of a list of a file name thereof, in a case that an alert occurs in any server belonging to a system in operation, or the like.

The aforementioned example embodiments may also be described as the following Supplementary Notes but are not limited thereto.

Supplementary Note 1

A file information collection system including:

information acquisition means that, when a process is identified, acquires, from a server on which the identified process operates, a process ID of each process represented in a tree structure indicating a parent-child relationship between processes including the identified process, and a file name and a file attribute of each file opened by the each process; and list generation means that selects a file a file name of which meets a predetermined condition, a file attribute of the file being writable or readable/writable, and generates, with the selected file as a target, a list of a record including identification information of a server outputting the file, the file name, and a server attribute of a server outputting the file, wherein the information acquisition means newly identifies a process called by an identified process, and subsequently to a process called by an identified process no longer existing, newly identifies a process being a caller of an initially identified process and successively identifies a new process being a caller of an identified process, and, when generating a list by a process being newly identified, the list generation means adds the list at a bottom of an already-generated list, the system further including sequence control means that selects a record from a top of the list one by one in a sequential order, acquires information about an update time of a file related to the selected record from a server outputting the file, and, when the update time is a time before a reference time specified by a user, changes a server attribute in the selected record to predetermined information and moves the record to a bottom of the list, wherein the server attribute is an attribute indicating a server on which an initially identified process operates, a callee server viewed from a server on which the initially identified process operates, a caller server viewed from a server on which the initially identified process operates, or the predetermined information.

Supplementary Note 2

The file information collection system according to Supplementary Note 1, wherein the sequence control means acquires information about an update time and information about a size of the selected file from a server outputting the file, and, when the update time precedes a reference time specified by a user or when the size is 0, changes a server attribute of the file to predetermined information and moves a record of the file to a bottom of a list.

Supplementary Note 3

The file information collection system according to Supplementary Note 1 or 2, further comprising display means that displays the file name included in the list for each server, wherein the display means changes a display mode of the file name depending on the server attribute.

Supplementary Note 4

The file information collection system according to Supplementary Note 1 or 2, wherein the sequence control means successively selects a set of a consecutive unselected record with common identification information of a server from a top of a list and acquires each file related to the selected set of a record from a server outputting the each file, for each file acquired by the sequence control means from the server, whether or not information indicating occurrence of an error is included is determined, and a type of a file not including the information is set to a specific type, and, when each and every file acquired from one server does not include the information, the sequence control means moves a set of a record in which a server attribute is a callee server to a bottom of a list, the set being a set of a record succeeding a most recently selected set of a record, and sets a type of each file related to the set of a record to the specific type.

Supplementary Note 5

The file information collection system according to Supplementary Note 4, wherein, when every file related to the selected set of a record does not include the error information, the sequence control means discontinues selection of a set of a record.

Supplementary Note 6

The file information collection system according to Supplementary Note 4 or 5, further comprising display means that displays the file name included in the list for each server, wherein the display means changes a display mode of the file name depending on the server attribute and the file type.

Supplementary Note 7

The file information collection system according to any one of Supplementary Notes 1 to 6, further comprising call relationship identification means that acquires, from each server, communication record information indicating a communication record, and identifies a call relationship between processes operating on the respective servers, based on communication record information of the respective servers.

Supplementary Note 8

A file information collection method, including:

when a process is identified, acquiring, from a server on which the identified process operates, a process ID of each process represented in a tree structure indicating a parent-child relationship between processes including the identified process, and a file name and a file attribute of each file opened by the each process;

selecting a file a file name of which meets a predetermined condition, a file attribute of the file being writable or readable/writable, and generating, with the selected file as a target, a list of a record including identification information of a server outputting the file, the file name, and a server attribute of a server outputting the file;

newly identifying a process called by an identified process, and subsequently to a process called by an identified process no longer existing, newly identifying a process being a caller of an initially identified process and successively identifying a new process being a caller of an identified process;

when generating a list by a process being newly identified, adding the list at a bottom of an already-generated list; and selecting a record from a top of the list one by one in a sequential order, acquiring information about an update time of a file related to the selected record from a server outputting the file, and when the update time is a time before a reference time specified by a user, changing a server attribute in the selected record to predetermined information and moving the record to a bottom of the list, wherein the server attribute is an attribute indicating a server on which an initially identified process operates, a callee server viewed from a server on which the initially identified process operates, a caller server viewed from a server on which the initially identified process operates, or the predetermined information.

Supplementary Note 9

A file information collection program causing a computer to:

execute:

information acquisition processing of, when a process is identified, acquiring, from a server on which the identified process operates, a process ID of each process represented in a tree structure indicating a parent-child relationship between processes including the identified process, and a file name and a file attribute of each file opened by the each process; and list generation processing of selecting a file a file name of which meets a predetermined condition, a file attribute of the file being writable or readable/writable, and generating, with the selected file as a target, a list of a record including identification information of a server outputting the file, the file name, and a server attribute of a server outputting the file;

newly identify a process called by a process identified in the information acquisition processing, and subsequently to a process called by an identified process no longer existing, newly identify a process being a caller of an initially identified process and successively identify a new process being a caller of an identified process;

when generating a list by a process being newly identified in the list generation processing, add the list at a bottom of an already-generated list; and execute sequence control processing of selecting a record from a top of the list one by one in a sequential order, acquiring information about an update time of a file related to the selected record from a server outputting the file, and when the update time is a time before a reference time specified by a user, changing a server attribute in the selected record to predetermined information and moving the record to a bottom of the list, wherein the server attribute is an attribute indicating a server on which an initially identified process operates, a callee server viewed from a server on which the initially identified process operates, a caller server viewed from a server on which the initially identified process operates, or the predetermined information.

While the present invention has been described above with reference to the example embodiments, the present invention is not limited to the aforementioned example embodiments. Various changes and modifications that can be understood by a person skilled in the art may be made to the configurations and details of the present invention, within the scope of the present invention.

This application claims priority based on Japanese Patent Application No. 2015-237675 filed on Dec. 4, 2015, the disclosure of which is hereby incorporated by reference thereto in its entirety.

INDUSTRIAL APPLICABILITY

The present invention is suitably applicable to a system collecting file information from a server and generating a list of a log file.

REFERENCE SIGNS LIST

1 File information collection system
2 Information acquisition means
3 File identification means
4 Call relationship information storage means
5 Sequence control means
6 Display means

What is claimed is:

1. A file information collection system comprising:
one or more processors configured to implement:
an information acquisition unit configured to acquire, when a process is identified, from a server on which the identified process operates, a process ID of each process, and a file name and a file attribute of each file used by the each process, in a plurality of processes in parent-child relationships with the identified process, the processes including a process called by the identified process and a process being a caller of the identified process;
a list generation unit configured to:
select a file whose name meets a predetermined condition, the file attribute of the file being writable or readable/writable,
generate, with the selected file as a target, a list of a record including identification information of a server outputting the file, the file name, and a server attribute of a server outputting the file, and,
when generating a list by identifying a new process, add the list at a bottom of an already-generated list;
a sequence control unit configured to:
select the record from a top of the list one by one in a sequential order,
acquire information about an update time of a file related to the selected record from a server outputting the file, and,
when the update time precedes a reference time specified by a user, change a server attribute in the selected record to predetermined information and moves the record to a bottom of the list; and
a display unit configured to control a display device to display the file name included in the list for each server, and change a display mode of the file name depending on the server attribute.

2. The file information collection system according to claim 1, wherein the sequence control unit is further configured to:
acquire information about an update time and information about a size of the selected file from a server outputting the file, and,
when the update time precedes a reference time specified by a user or when the size is 0, change a server attribute of the file to predetermined information and moves a record of the file to a bottom of a list.

3. The file information collection system according to claim 2, wherein the sequence control unit is further configured to:
successively select a set of a consecutive unselected record with common identification information of the server from a top of the list and acquire each file related to the selected set of a record from a server outputting the each file,
determine for each acquired file whether or not error information indicating occurrence of an error is included and set a type of a file not including the error information to a specific type, and,
when every file acquired from one server does not include the error information, move a set of a record in which the server attribute is the callee server, to a bottom of the list, the set being a set of a record succeeding a most recently selected set of a record, and also set a type of each file related to the set of a record to the specific type, and
wherein the server attribute is information indicating any of a server on which the identified process operates, a callee server with respect to a server on which the identified process operates, a caller server with respect to a server on which the identified process operates, and the predetermined information.

4. The file information collection system according to claim 2, wherein the one more processors are further configured to implement a forming call relationship identification unit configured to:
acquire, from each server, communication record information indicating a communication record, and
identify a call relationship between processes operating on the respective servers, based on communication record information of the respective servers.

5. The file information collection system according to claim 1, wherein the sequence control unit is further configured to:
  successively select a set of a consecutive unselected record with common identification information of the server from a top of the list and acquires each file related to the selected set of a record from a server outputting the each file,
  determine for each acquired file whether or not error information indicating occurrence of an error is included and sets a type of a file not including the error information to a specific type, and,
  when every file acquired from one server does not include the error information, move a set of a record in which the server attribute is a callee server, to a bottom of the list, the set being a set of a record succeeding a most recently selected set of a record, and also set a type of each file related to the set of a record to the specific type, and
  wherein the server attribute is information indicating any of a server on which the identified process operates, a callee server with respect to a server on which the identified process operates, a caller server with respect to a server on which the identified process operates, and the predetermined information.

6. The file information collection system according to claim 5, wherein,
  when every file related to the selected set of a record does not include the error information, the sequence control unit is further configured to discontinue selection of a set of a record.

7. The file information collection system according to claim 6, wherein the one more processors are further configured to implement a forming call relationship identification unit configured to:
  acquire, from each server, communication record information indicating a communication record, and
  identify a call relationship between processes operating on the respective servers, based on communication record information of the respective servers.

8. The file information collection system according to claim 5, wherein the one more processors are further configured to implement a forming call relationship identification unit configured to:
  acquire, from each server, communication record information indicating a communication record, and
  identify a call relationship between processes operating on the respective servers, based on communication record information of the respective servers.

9. The file information collection system according to claim 1, wherein the one more processors are further configured to implement a forming call relationship identification unit configured to:
  acquire, from each server, communication record information indicating a communication record, and
  identify a call relationship between processes operating on the respective servers, based on communication record information of the respective servers.

10. The file information collection system according to claim 9, wherein the one more processors are further configured to implement a forming call relationship identification unit configured to: acquire, from each server, communication record information indicating a communication record, and identify a call relationship between processes operating on the respective servers, based on communication record information of the respective servers.

11. The file information collection system according to claim 1, wherein the one more processors are further configured to implement a forming call relationship identification unit configured to: acquire, from each server, communication record information indicating a communication record, and identify a call relationship between processes operating on the respective servers, based on communication record information of the respective servers.

12. A file information collection method comprising:
  when a process is identified, acquiring, from a server on which the identified process operates, a process ID of each process, and a file name and a file attribute of each file used by the each process, in a plurality of processes in parent-child relationships with the identified process, the processes including a process called by the identified process and a process being a caller of the identified process;
  selecting a file the file name of which meets a predetermined condition, the file attribute of the file being writable or readable/writable, generating, with the selected file as a target, a list of a record including identification information of a server outputting the file, the file name, and a server attribute of a server outputting the file, and, when generating a list by identifying a new process, adding the list at a bottom of an already-generated list;
  selecting the record from a top of the list one by one in a sequential order, acquiring information about an update time of a file related to the selected record from a server outputting the file, and, when the update time precedes a reference time specified by a user, changing a server attribute in the selected record to predetermined information and moving the record to a bottom of the list; and
  displaying the file name included in the list for each server, and changing a display mode of the file name depending on the server attribute.

13. A non-transitory computer readable storage medium storing a file information collection program causing a computer to provide a function of:
  when a process is identified, acquiring, from a server on which the identified process operates, a process ID of each process, and a file name and a file attribute of each file used by the each process, in a plurality of processes in parent-child relationships with the identified process, the processes including a process called by the identified process and a process being a caller of the identified process;
  selecting a file the file name of which meets a predetermined condition, the file attribute of the file being writable or readable/writable, generating, with the selected file as a target, a list of a record including identification information of a server outputting the file, the file name, and a server attribute of a server outputting the file, and, when generating a list by identifying a new process, adding the list at a bottom of an already-generated list;
  selecting the record from a top of the list one by one in a sequential order, acquiring information about an update time of a file related to the selected record from a server outputting the file, and, when the update time precedes a reference time specified by a user, changing a server attribute in the selected record to predetermined information and moving the record to a bottom of the list; and displaying the file name included in the list for each server, and changing a display mode of the file name depending on the server attribute.

\* \* \* \* \*